(12) United States Patent
Dou et al.

(10) Patent No.: US 12,391,575 B2
(45) Date of Patent: Aug. 19, 2025

(54) POSITIVE ELECTRODE ACTIVE MATERIAL AND PREPARATION METHOD THEREOF, POSITIVE ELECTRODE PLATE, LITHIUM-ION SECONDARY BATTERY, AND BATTERY MODULE, BATTERY PACK, AND APPARATUS CONTAINING SUCH LITHIUM-ION SECONDARY BATTERY

(71) Applicant: CONTEMPORARY AMPEREX TECHNOLOGY (HONG KONG) LIMITED, Hong Kong (CN)

(72) Inventors: Shushi Dou, Ningde (CN); Chunhua Hu, Ningde (CN); Yao Jiang, Ningde (CN); Qi Wu, Ningde (CN); Jinhua He, Ningde (CN); Bin Deng, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 636 days.

(21) Appl. No.: 17/683,570

(22) Filed: Mar. 1, 2022

(65) Prior Publication Data

US 2022/0185698 A1 Jun. 16, 2022

Related U.S. Application Data

(63) Continuation of application No. PCT/CN2020/109828, filed on Aug. 18, 2020.

(30) Foreign Application Priority Data

Sep. 2, 2019 (CN) .......................... 201910824785.7

(51) Int. Cl.
*C01G 53/50* (2025.01)
*H01M 10/0525* (2010.01)

(52) U.S. Cl.
CPC ........ *C01G 53/50* (2013.01); *H01M 10/0525* (2013.01); *C01P 2002/54* (2013.01);
(Continued)

(58) Field of Classification Search
CPC .......................... H01M 10/0525; C01G 53/50
See application file for complete search history.

(56) References Cited

U.S. PATENT DOCUMENTS

2014/0315090 A1  10/2014  Shimazu et al.
2014/0367609 A1* 12/2014  Kapylou ................ C01G 53/50
                                                    252/182.1
(Continued)

FOREIGN PATENT DOCUMENTS

CN   105027336 A   11/2015
CN   108140819 A   6/2018
(Continued)

OTHER PUBLICATIONS

Chinese Office Action for International Application PCT/CN2019/108247857 mailed Jul. 14, 2021.
(Continued)

*Primary Examiner* — Karie O'Neill Apicella
(74) *Attorney, Agent, or Firm* — Ladas & Parry LLP

(57) ABSTRACT

A positive electrode active material and a preparation method thereof, a positive electrode plate, a lithium-ion secondary battery, and a battery module, a battery pack, and apparatus containing the lithium-ion secondary battery are provided. The positive electrode active material includes secondary particles formed by agglomeration of primary particles, where the primary particles include a layered nickel-containing lithium composite oxide, and the nickel-containing lithium composite oxide includes a doping element; and when the positive electrode active material is charged from an 11% delithiated state to a 78% delithiated
(Continued)

state at a rate of 0.1 C, a lattice of the primary particles has a maximum shrinkage rate satisfying $\Delta a_{max} \leq 3.00\%$ in an a-axis direction, and a maximum swelling rate satisfying $\Delta c_{max} \leq 3.02\%$ in a c-axis direction.

12 Claims, 4 Drawing Sheets

(52) U.S. Cl.
CPC ...... *C01P 2004/61* (2013.01); *C01P 2006/10* (2013.01); *C01P 2006/11* (2013.01); *C01P 2006/12* (2013.01); *C01P 2006/40* (2013.01)

(56) References Cited

U.S. PATENT DOCUMENTS

| | | | |
|---|---|---|---|
| 2016/0156032 | A1 | 6/2016 | Lee et al. |
| 2017/0358798 | A1* | 12/2017 | Kageura ............ C01G 53/006 |

FOREIGN PATENT DOCUMENTS

| | | | | |
|---|---|---|---|---|
| CN | 108470892 | A | | 8/2018 |
| JP | 2004356034 | A | | 12/2004 |
| JP | 2016136489 | A | * | 7/2016 ........ H01M 10/0525 |
| WO | 2018211375 | A1 | | 11/2018 |

OTHER PUBLICATIONS

ISR for International Application PCT/CN2020/109828 mailed Nov. 3, 2021.

Written Opinion for International Application PCT/CN2020/109828 mailed Nov. 3, 2021.
Second Chinese Office Action dated Oct. 26, 2021 for Application No. CN 201910824785.7.
Chinese Rejection Decision dated Feb. 8, 2022 for Application No. CN 201910824785.7.
Extended European Search Report dated May 11, 2022 for Application No. EP 20861587.2.
Chinese Notice of Reexamination dated Sep. 27, 2022 for Application No. CN 201910824785.7.
Chinese Reexamination Decision dated Nov. 24, 2022 for Application No. CN 201910824785.7.
Aziam H. et al: "Understanding the electrochemical lithiation/delithiation process in the anode material for lithium ion batteries NiFeOPO4/C using ex-situ X-ray absorption near edge spectroscopy and in-situ synchrotron X-ray", Electrochimica Acta, vol. 283, Sep. 1, 2018 (Sep. 1, 2018), pp. 1238-1244, XP055916509, Amsterdam, NL.
Ping Cui et al: "Preparation and characteristics of Sb-doped LiNiOcathode materials for Li-ion batteries", Journal of Physics and Chemistry of Solids, Pergamon Press, London, GB, vol. 72, No. 7, Apr. 22, 2011 (Apr. 22, 2011), pp. 899-903, XP028221252.
Lei Yike et al: "Nb-doping in LiNi0.8Co0.1Mn0.1O2 cathode material: Effect on the cycling stability and voltage decay at high rates", Journal of the Taiwan Institute of Chemical Engineers, vol. 97, Feb. 8, 2019 (Feb. 8, 2019), pp. 255-263, XP055916576, Amsterdam, NL.
Li Wangda et al: "Collapse of LINi 1-x-1 y Co x Mn y 0 2 Lattice at Deep Charge Irrespective of Nickel Content in Lithium-Ion Batteries", Journal of the American Chemical Society, vol. 141, No. 13, Mar. 19, 2019 (Mar. 19, 2019), pp. 5097-5101, XP055917305.

* cited by examiner

POSITIVE ELECTRODE ACTIVE MATERIAL AND PREPARATION METHOD THEREOF, POSITIVE ELECTRODE PLATE, LITHIUM-ION SECONDARY BATTERY, AND BATTERY MODULE, BATTERY PACK, AND APPARATUS CONTAINING SUCH LITHIUM-ION SECONDARY BATTERY

CROSS-REFERENCE TO RELATED APPLICATIONS

This application is a continuation of International Patent Application No. PCT/CN2020/109828 filed on 18 Aug. 2020, which claims priority to Chinese patent application No. 201910824785.7, filed on Sep. 2, 2019 and entitled "POSITIVE ELECTRODE ACTIVE MATERIAL, POSITIVE ELECTRODE PLATE, AND LITHIUM-ION SECONDARY BATTERY", which is incorporated herein by reference in its entirety.

TECHNICAL FIELD

This application relates to the technical field of secondary batteries, and more specifically, to a positive electrode active material and a preparation method thereof, a positive electrode plate, a lithium-ion secondary battery, and a battery module, battery pack, and apparatus containing such lithium-ion secondary battery.

BACKGROUND

Lithium-ion secondary batteries are rechargeable batteries that operate mainly depending on migration of lithium ions between a positive electrode and a negative electrode. They are a form of clean energy that is widely used currently. As an important part of a lithium-ion secondary battery, a positive electrode active material provides the lithium ions that move back and forth between the positive and negative electrodes in a battery charge/discharge process, and therefore the positive electrode active material is of great importance to battery performance.

A nickel-containing lithium composite oxide has relatively high theoretical capacity. A lithium-ion secondary battery using a nickel-containing lithium composite oxide can be expected to have higher energy density, but a study has revealed that such lithium-ion secondary battery has poor high-temperature cycling performance.

SUMMARY

A first aspect of this application provides a positive electrode active material, including secondary particles formed by agglomeration of primary particles, where the primary particles include a layered nickel-containing lithium composite oxide, and the nickel-containing lithium composite oxide includes a doping element; and when the positive electrode active material is charged from an 11% delithiated state to a 78% delithiated state at a rate of 0.1 C, a lattice of the primary particles has a maximum shrinkage rate satisfying $\Delta a_{max} \leq 3.00\%$ in an a-axis direction, and a maximum swelling rate satisfying $\Delta c_{max} \leq 3.02\%$ in a c-axis direction.

The positive electrode active material provided in this application includes secondary particles formed by agglomeration of primary particles, and the primary particles include the layered nickel-containing lithium composite oxide. The nickel-containing lithium composite oxide has a relatively high charge and discharge voltage and specific capacity, and therefore, the lithium-ion secondary battery using the positive electrode active material can have relatively high capacity performance and energy density. In addition, the nickel-containing lithium composite oxide also includes the doping element, and during delithiation, a lattice of the primary particles has a relatively small shrinkage rate along the a-axis direction and swelling rate along the c-axis direction, which improves structural :stability of the secondary particles, and effectively prevents a crack between the primary particles during high-temperature cycling, so that the secondary particles are not prone to cracking, thereby significantly improving high-temperature cycling performance of the lithium-ion secondary battery In any one of the foregoing embodiments, a molar percentage of nickel in elements at the transition metal site of the nickel-containing lithium composite oxide is 50% to 95%, optionally 50% to 90%, and further optionally 60% to 90%. The positive electrode active material can have higher capacity performance, thereby further improving the energy density of the battery.

In some embodiments, when a molar percentage of nickel in elements at a transition metal site of the nickel-containing lithium composite oxide is 50% to 60% and the positive electrode active material is charged from an 11% delithiated state to a 78% delithiated state at a rate of 0.1 C, a lattice of the primary particles has a maximum shrinkage rate satisfying $\Delta a_{max} \leq 2.69\%$ in an a-axis direction, and a maximum swelling rate satisfying $\Delta c_{max} \leq 2.75\%$ in a c-axis direction. When the molar percentage of nickel in the elements at the transition metal site of the nickel-containing lithium composite oxide is 50% to 60%, $\Delta a_{max}$ and $\Delta c_{max}$ of the positive electrode active material falling within the foregoing range can further improve the structural stability and the capacity thereby further improving the energy density and high-temperature cycling performance of the battery.

In some embodiments, when a molar percentage of nickel in elements at a transition metal site of the nickel-containing lithium composite oxide is greater than 60% and less than or equal to 90% and the positive electrode active material is charged from an 11% delithiated state to a 78% delithiated state at a rate of 0.1 C, a lattice of the primary particles has a maximum shrinkage rate satisfying $\Delta a_{max} \leq 2.85\%$ in an a-axis direction, and a maximum swelling rate satisfying $\Delta c_{max} \leq 2.93\%$ in a c-axis direction. When the molar percentage of nickel in the elements at the transition metal site of the nickel-containing lithium composite oxide is greater than 60% and less than or equal to 90%, $\Delta a_{max}$ and $\Delta c_{max}$ of the positive electrode active material falling within the foregoing range can further improve the structural stability and the capacity, so that the battery obtains higher energy density and high-temperature cycling performance.

In any one of the foregoing embodiments, a relative deviation of a local mass concentration of the doping element in the secondary particles is less than 30%, optionally less than 20%, and further optionally less than 15%. The doping element is highly uniformly distributed in the secondary particles. Lattices of the primary particles have relatively consistent shrinkage changes along the a-axis direction, and relatively consistent expansion changes along the c-axis direction, migration and diffusion capabilities of lithium ions in different internal zones of particles are at a same level, and internal stresses of the particles are evenly distributed. Therefore, the doping element can better improve structural stability of the positive electrode active material. In this way, the extractable capacity and high-temperature cycling performance of the positive electrode active material are improved, thereby improving the energy density and high-temperature cycling performance of the lithium-ion secondary battery.

In any one of the foregoing embodiments, the doping element includes a first doping element doping a transition metal site of the nickel-containing lithium composite oxide; and when the positive electrode active material is in the 78% delithiated state, the first doping element has a valence higher than +3, and optionally has one or more of valences of +4, +5, +6, +7, and +8. The first doping element enables the positive electrode to release more lithium ions, and also helps improve the lattice stability of the primary particles and the structural stability of the positive electrode active material, thereby improving the energy density and high-temperature cycling performance of the lithium-ion secondary battery.

In any one of the foregoing embodiments, the first doping element is selected from one or more of Si, Ti, V, Ge, Se, Zr, Nb, Ru, Pd, Rh. Sb, Te, Ce, and W; and optionally, the first doping element includes one or more of Ti, Nb, Ru, Sb, Te, and W. The first doping element can better improve the energy density and high-temperature cycling performance of the lithium-ion secondary battery.

In any one of the foregoing embodiments, the doping element includes a second doping element doping an oxygen site of the nickel-containing lithium composite oxide, and the second doping, element is selected from one or more of F, N, P, and S. The second doping element can reduce the shrinkage rate of the lattice of the primary particles along the a-axis direction and the swelling rate of the lattice of the primary particles along the c-axis direction, thereby improving the structural stability of the positive electrode active material and the high-temperature cycling performance of the lithium-ion secondary battery.

In any one of the foregoing embodiments, a true doping concentration $\varphi$ of the positive electrode active material satisfies 2300 $\mu g/cm^3 \leq \varphi \leq$ 49000 $\mu g/cm^3$, optionally 3000 $\mu g/cm^3 \leq \varphi \leq$ 30000 $\mu g/cm^3$, and optionally 14820 $\mu g/cm^3 \leq \varphi \leq$ 30000 $\mu g/cm^3$. When the true doping concentration of the positive electrode active material is within the foregoing range, :lattice stability of the primary particles can be improved and the positive electrode active material can provide a good carrier for delithiation or lithiation of the lithium ions, so that the positive electrode active material has a relatively high initial capacity and cycling capacity retention rate and the battery has a relatively high energy density and cycling performance.

In any one of the foregoing embodiments, a deviation $\varepsilon$ of a mass concentration of the doping element in the positive electrode active material relative to an average mass concentration of the doping element in the secondary, particles satisfies $\varepsilon < 50\%$, optionally $\varepsilon \leq 30\%$, and optionally $\varepsilon \leq 20\%$. When $\varepsilon$ of the positive electrode active material is within the foregoing range, the positive electrode active material has good macroscopic and microscopic consistency and overall stability of the particles is high, thereby helping the positive electrode active material achieve a relatively high extractable capacity and high-temperature cycling performance.

In any one of the foregoing embodiments, the true density $\rho_{true}$ of the positive electrode active material satisfies 4.6 g/cm$^3 \leq \rho_{true} \leq$ 4.9 g/cm$^3$. The positive electrode active material can have a relatively high specific capacity, thereby improving the energy density of the battery.

In any one of the foregoing embodiments, a volume average particle size $D_v 50$ of the positive electrode active material is 5 µm to 20 µm, optionally 8 µm to 15 µm, and further optionally 9 µm to 11 µm. When $D_v 50$ of the positive electrode active material is within the foregoing range, the cycling performance and rate performance of the lithium-ion secondary battery can be improved, and the energy density of the battery can be increased.

In any one of the foregoing embodiments, a specific surface area of the positive electrode active material is 0.2 m$^2$/g to 1.5 m$^2$/g, and optionally 0.3 m$^2$/g to 1 m$^2$/g. When the specific surface area of the positive electrode active material is within the foregoing range, the battery can have a relatively high energy density and cycling performance.

In any one of the foregoing embodiments, tap density of the positive electrode active material is 2.3 g/cm$^3$ to 2.8 g/cm$^3$. When the tap density of the positive electrode active material is within the foregoing range, the lithium-ion secondary battery can have a relatively high energy density.

In any one of the foregoing embodiments, compacted density of the positive electrode active material under a pressure of 5 tons (equivalent to 49 kN) is 3.1 g/cm$^3$ to 3.8 g/cm$^3$. When the compacted density of the positive electrode active material is within the specified range, the lithium-ion secondary battery can have a relatively high energy density.

In any one of the foregoing embodiments, the nickel-containing lithium composite oxide can satisfy a chemical formula $Li_{1+m}[Ni_xCo_yMn_zM_p]O_{2-q}X_q$, where M and X are doping elements, M is selected from one or more of Si, Ti, Ge, Se, Zr, Nb, Ru, Pd, Rh, Sb, Te, Ce, and W, X is selected from one or more of F, N, P, and S, $0.5 \leq x < 1$, $0 \leq y < 0.3$, $0 \leq z < 0.3$, $-0.1 \leq m < 0.2$, $0 \leq p < 0.3$, $0 \leq q < 0.2$, $x+y+z+p=1$, and p and q are not 0 simultaneously.

In any one of the foregoing embodiments, the nickel-containing lithium composite oxide satisfies a chemical formula $Li_{1+n}[Ni_{r-d}Co_sMn_tM'_d]O_{2-v}X'_v$, where M' and X' are doping elements, M' is selected from one or more of Si, Ti, V, Ge, Se, Zr, Nb, Ru, Pd, Rh, Sb, Te, Ce, and W, X' is selected from one or more of F, N, P, and S, $0.5 \leq r-d < 1$, $0 \leq s < 0.3$, $0 \leq t < 0.3$, $-0.1 \leq n < 0.2$, $0 \leq d < 0.3$, $0 \leq v < 0.2$, $r+s+t=1$, and d and v are not 0 simultaneously.

A second aspect of this application provides a preparation method of a positive electrode active material, including the following steps: mixing a precursor of the positive electrode active material, a lithium source, and a precursor of a doping element to obtain a mixture, where the precursor of the positive electrode active material is selected from one or more of an oxide, hydroxide, or carbonate that contains Ni, optionally Co, and optionally Mn, and performing sintering treatment on the mixture in an oxygen-containing atmosphere at a temperature of 600° C. to 1000° C. to obtain the positive electrode active material, where the positive electrode active material includes secondary particles formed by agglomeration of primary particles, where the primary particles include a layered nickel-containing lithium composite oxide, and the nickel-containing lithium composite oxide includes a doping element; and when the positive electrode active material is charged from an 11% delithiated state to a 78% delithiated state at a rate of 0.1 C, a lattice of the primary particles has a maximum shrinkage rate satisfying $\Delta a_{max} \leq 3.00\%$ in an a-axis direction, and a maximum swelling rate satisfying $\Delta c_{max} \leq 3.02\%$ in a c-axis direction.

The positive electrode active material obtained according to the preparation method provided in this application includes secondary particles formed by agglomeration of primary particles, the primary particles include a layered nickel-containing lithium composite oxide, the nickel-containing lithium composite oxide further includes a doping element, and during delithiation, a lattice of the primary particles has a relatively small shrinkage rate along the a-axis direction and swelling rate along the c-axis direction, so that the positive electrode active material has a relatively high grain capacity and structural stability, and the lithium-ion secondary battery using the positive electrode active material can have both a relatively high energy density and high-temperature cycling performance.

In any one of the foregoing embodiments, the precursor of the doping element may include one or more of a precursor of a first doping element and a precursor of a second doping element.

The precursor of the first doping element may be selected from one or more of a silicon oxide, a titanium oxide, a vanadium oxide, a germanium oxide, a selenium oxide, a zirconium oxide, a niobium oxide, a ruthenium oxide, a palladium oxide, a rhodium oxide, an antimony oxide, a tellurium oxide, a cerium oxide, and a tungsten oxide. Optionally, the precursor of the first doping element is selected from one or more of $SiO_2$, $SiO$, $TiO_2$, $TiO$, $V_2O_5$, $V_2O_3$, $GeO_2$, $SeO_2$, $ZrO_2$, $Nb_2O_5$, $NbO_2$, $RuO_2$, $PdO$, $Rh_2O_3$, $Sb_2O_5$, $TeO_2$, $CeO_2$, $WO_2$, and $WO_3$.

The precursor of the second doping element may be selected from one or more of ammonium fluoride, lithium fluoride, hydrogen fluoride, elemental phosphorus, phosphorus oxide, ammonium dihydrogen phosphate, ammonium metaphosphate, ammonium dihydrogen phosphite, ammonium nitrate, ammonium nitrite, ammonium carbonate, an bicarbonate, ammonium sulfate, ammonium bisulfate, ammonium bisulfite, ammonium sulfite, ammonium hydrosulfide, hydrogen sulfide, lithium sulfide, ammonium sulfide, and elemental sulfur. Optionally, the precursor of the second doping element is selected from one or more of ammonium fluoride, lithium fluoride, and hydrogen fluoride.

In any one of the foregoing embodiments, the sintering treatment satisfies at least one of the following:
the oxygen-containing atmosphere is an air atmosphere or an oxygen atmosphere;
a temperature of the sintering treatment is 700° C. to 900° C. and
duration of the sintering treatment is 5 h to 25 h, and optionally 10 h to 20 h.

In some embodiments, the precursor of the doping element may be equally divided into L parts or randomly divided into L parts and used for doping in L batches, where L is 1 to 5, and optionally 2 or 3, and the method includes: mixing the precursor of the positive electrode active material, the lithium source, and a first batch of precursor of the doping element, and performing a first sintering treatment; and mixing a product of the first sintering treatment with a second batch of precursor of the doping element, performing a second sintering treatment, and so on, until a product of an $(L-1)^{th}$ sinistering treatment is mixed with an $L^{th}$ batch of precursor of the doping element, and an $L^{th}$ sinistering treatment is performed to obtain the positive electrode active material.

Optionally, a temperature of each sintering treatment is 600° C. to 1000° C. optionally 700° C. to 900° C., and further optionally 800° C. to 850°C.; duration of each sintering treatment is 3 h to 20 h, and optionally 5 h to 15 h and total duration of sintering treatments is 5 h to 25 h, and optionally 10 h to 20 h.

A third aspect of this application provides a positive electrode plate, including a positive electrode current collector and a positive electrode active substance layer disposed on the positive electrode current collector, where the positive electrode active substance layer includes the positive electrode active material according to the first aspect of this application or the positive electrode active material obtained in the preparation method according to the second aspect of this application.

Because the positive electrode plate in this application contains the positive electrode active material, the lithium-ion secondary battery using the positive electrode plate can have a relatively high energy density and high-temperature cycling performance.

A fourth aspect of this application provides a lithium-ion secondary battery, including the positive electrode plate according to the third aspect of this application.

Because the lithium-ion secondary battery in this application contains the positive electrode plate, the lithium-ion secondary battery can have a relatively high energy density and high-temperature cycling performance.

A fifth aspect of this application provides a battery module, including the lithium-ion secondary battery according to the fourth aspect of this application.

A sixth aspect of this application provides a battery pack, including the lithium-ion secondary battery according to the fourth aspect of this application or the battery module according to the fifth aspect of this application.

A seventh aspect of this application provides an apparatus, including at least one of the lithium-ion secondary battery according to the fourth aspect of this application, the battery module according to the fifth aspect of this application, or the battery pack according to the sixth aspect of this application.

The battery module, the battery pack, and the apparatus in this application contain the lithium-ion secondary battery in this application, and therefore have at least effects that are the same as or similar to those of the lithium-ion secondary battery.

BRIEF DESCRIPTION OF DRAWINGS

To describe the technical solutions in the embodiments of this application more clearly the following briefly describes the accompanying drawings required for describing the embodiments of this application. Apparently, the accompanying drawings in the following description show merely some embodiments of this application, and a person of ordinary skill in the art may still derive other drawings from the accompanying drawings without creative efforts.

DESCRIPTION OF EMBODENIENTS

Figure 1:
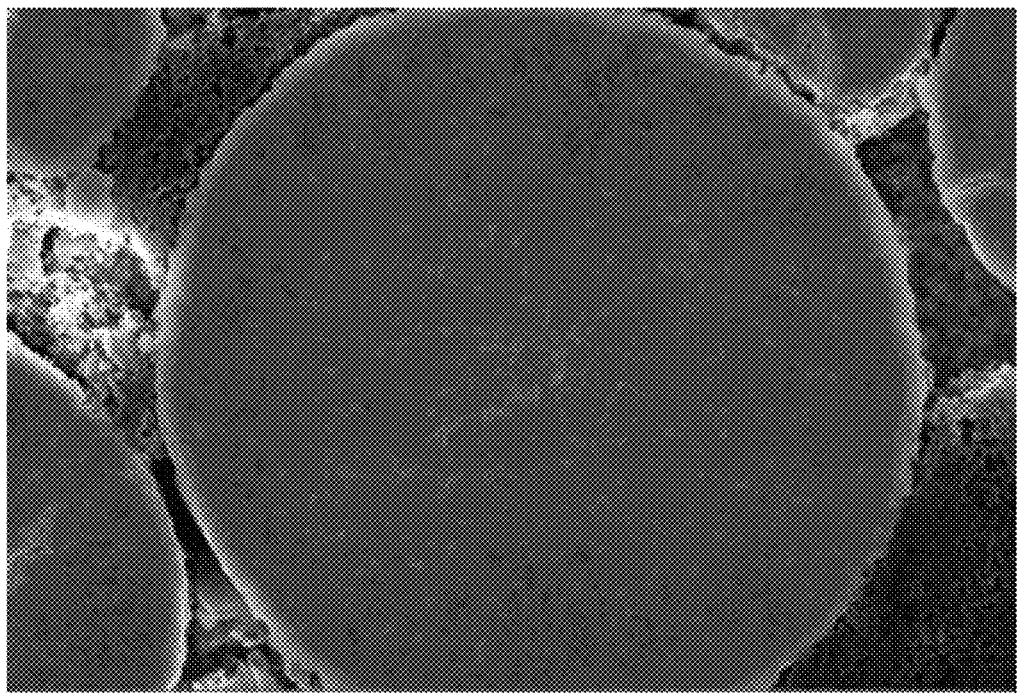
FIG. 1 is a scanning electron microscope (scanning electron microscope, SEM) image of a positive electrode active material after cycling according to Example 1.

To make the objectives, technical solutions, and beneficial technical effects of this application clearer, the following further describes this application in detail with reference to the embodiments. It should be understood that the embodiments described in this specification are merely intended to interpret this application, but not intended to limit this application.

For simplicity, only some numerical ranges are expressly disclosed in this specification. However, any lower limit may be combined with any upper limit to form a range not expressly recorded; any lower limit may be combined with any other lower limit to form a range not expressly recorded; and any upper limit may be combined with any other upper limit to form a range not expressly recorded. In addition, although not expressly recorded, each point or individual value between endpoints of a range is included in the range. Therefore, each point or individual value may be used as its own lower limit or upper limit to be combined with any other point or individual value or combined with any other lower limit or upper limit to form a range not expressly recorded.

In the description of this specification, it should be noted that, unless otherwise stated, "more than" and "less than" a number means inclusion of the number itself, and "more types" in "one or more types" means at least two types. "More" in "one or more" means at least two.

In the description of this specification, unless otherwise stated, the term "or (or)" indicates inclusion. For example, the phrase "A or (or) B" means "A, B, or both A and B". More specifically, any one of the following conditions satisfies a condition "A or B": A is true (or exists) and B is false (or does not exist); A is false (or does not exist) and B is true (or exists): or both A and B are true (or exist).

The foregoing invention content of this application is not intended to describe each of the disclosed embodiments or implementations of this application. The following description illustrates exemplary embodiments in detail by using examples. Throughout this application, guidance is provided by using a series of embodiments and the embodiments may be used in various combinations. In each instance, enumeration is only representative but should not be interpreted as exhaustive.

Positive Electrode Active Material

This application provides a positive electrode active material, including secondary particles formed by agglomeration of primary particles, where the primary particles include a nickel-containing lithium composite oxide, the nickel-containing lithium composite oxide has a layered crystal structure, and the nickel-containing lithium composite oxide includes a doping element; and when the positive electrode active material is charged from an 11% delithiated state to a 78% delithiated state at a rate of 0.1 C, a lattice of the primary particles has a maximum shrinkage rate satisfying $\Delta a_{max} \leq 3.00\%$ in an a-axis direction, and a maximum swelling rate satisfying $\Delta c_{max} \leq 3.02\%$ in a c-axis direction.

In this specification, the foregoing "charging the positive electrode active material at a rate of 0.1 C" means charging a standard half cell composed of an electrode containing the positive electrode active material and a lithium metal counter electrode with a constant current of at a rate of 0.1 C at 25° C. to 45° C. The standard half cell may be a button cell. The electrode containing the positive electrode active material includes a positive electrode current collector and a positive electrode active substance layer applied on a surface of the positive electrode current collector. The positive electrode active substance layer includes the positive electrode active material in this application. The percentages of the positive electrode active material and an optional conductive agent or binder included in the positive electrode active substance layer are not specifically limited as long as a normal working requirement of the standard half cell is met. The electrode containing the positive electrode active material may also be a positive electrode plate that is detached from a full cell and cut into a suitable size through stamping. A non-aqueous organic solvent electrolyte may be used as an electrolyte of the standard half cell, and the non-aqueous organic solvent electrolyte may be the same as or different from an electrolyte of the lithium-ion secondary battery.

In this specification, "78% delithiated state" means a state in which the number of moles of lithium released from the positive electrode active material is 78% of the total theoretical number of moles of lithium during charging of the battery. Likewise, "11% delithiated state" means a state in which the number of moles of lithium released from the positive electrode active material is 11% of the total theoretical number of moles of lithium during charging of the battery. During actual use of the lithium-ion secondary battery, a "fully-discharged state" and a "fully-charged state" are generally set, and correspondingly a "discharge cut-off voltage" and a "charge cut-off voltage" for the battery are set to ensure safe use of the battery. The "discharge cut-off voltage" and "charge cut-off voltage" vary with the positive electrode active materials or safety requirements. For the secondary battery prepared by using the positive electrode active material containing the nickel-containing, lithium composite oxide, when it is in the "fully-discharged state", the positive electrode active material is usually in the "11% delithiated state"; when it is in the "fully-charged state", the positive electrode active material is usually in the "78% delithiated state". When the battery is being charged or discharged, the positive electrode active material works between the 11% delithiated state and the 78% delithiated state to ensure normal use.

In this specification, with reference to a correspondence between the "delithiated state" and the "voltage", positive electrode active materials in the "11% delithiated state" and the "78% delithiated state" are obtained for a study. Specifically, a series of standard button half cells are prepared by using the positive electrode active material, and respectively charged to 2.8 V, 2.9 V, 3.0 V, 3.1 V, 3.2 V, 3.3 V, . . . , 4.0 V, 4.1 V, 4.2 V, 4.3 V, 4.4 V, and 4.5 V (that is, a charging voltage step is 0.1 V) at a rate of 0.1 C, then a positive electrode plate of the battery is taken out to wash out an electrolyte, the positive electrode active material is subjected to digestion, and a mass concentration of element Li of the positive electrode active material is determined by using an inductively coupled plasma-optical emission spectrometer (ICP-OES), to calculate the "delithiated state", obtain a correspondence between charging voltages and "delithiated states", and further obtain charging voltages corresponding to the "11% delithiated state" and the "78% delithiated state".

Then, a plurality of half cells containing the positive electrode active material are separately charged to a voltage $U_1$ corresponding to the "11% delithiated state", a voltage $U_2$ corresponding to the "78% delithiated state", and more than one voltage between $U_1$ and $U_2$. Positive electrode active materials in the "11% delithiated state", "78% delithiated state", and more than one delithiated state between the "11% delithiated state" and the "78% delithiated state" can be obtained separately Then, X-ray diffraction analysis (XRD) is performed on the positive electrode active material, and interplanar distances d[003], d[104], and d[110] of crystal planes [003], [104], and [110] are obtained based on X-ray diffraction patterns.

Unit cell parameters a and c are calculated based on a peak [110] and a peak [104], where $$a = 2 \times d[110]$$

$$c = \frac{4}{\sqrt{\frac{1}{(d[104])^2} - \frac{4}{3}\Big/a^2}}$$

Alternatively, unit cell parameters a and c are calculated based on a peak [003] and a peak [104], where $$c = 3 \times d[003]$$

$$a = \sqrt{\frac{4}{3(d[104])^2} - \frac{16}{c^2}}$$

After unit cell parameters a and c of the positive electrode active material in different states in a delithiation range of 11% to 78% are obtained, change rates of the unit cell parameters a and c in each state are calculated based on the 11% delithiated state, a maximum shrinkage rate of the unit cell parameter a is selected and recorded as the maximum shrinkage rate $\Delta a_{max}$ of the lattice in the a-axis direction, and a maximum swelling rate of the unit cell parameter c is selected and recorded as the maximum swelling rate $\Delta c_{max}$ of the lattice in the c-axis direction.

The positive electrode active material in this application includes secondary particles formed by agglomeration of primary particles, and the primary particles include a nickel-containing lithium composite oxide. The nickel-containing lithium composite oxide has a relatively high charge and discharge voltage and specific capacity, and therefore, the lithium-ion secondary battery using the positive electrode active material can have relatively high capacity performance and energy density.

During delithiation of the positive electrode active material, that is, during charging of the lithium-ion secondary battery, as lithium ions are released from the positive electrode active material, a transition metal in the positive electrode active material loses electrons, the transition metal changes to a higher valence, and a bond length of the transition metal and an oxygen atom reduces, causing a lattice of the primary particles to gradually shrink in the a-axis direction and gradually expand in the c-axis direction. The nickel-containing lithium composite oxide also includes a doping element, which can effectively support a lattice structure. In addition, during delithiation of the positive electrode active material, the lattice of the primary particles has a relatively small shrinkage rate along the a-axis direction and swelling, rate along the c-axis direction. The primary particles with relatively high lattice stability help improve structural stability of the positive electrode active material, and effectively prevent a crack between anisotropically arranged primary particles during high-temperature cycling, so that the secondary particles are not prone to crack, thereby significantly improving high-temperature cycling performance of the lithium-ion secondary battery.

The secondary particles of the positive electrode active material are not prone to crack, which prevents an electronically conductive channel at a crack from breaking and ensures continuity of a conductive network in the positive electrode active substance layer, thereby ensuring that the battery has small impedance, so that the battery has good electrochemical performance, extractable capacity and high-temperature cycling performance. The relatively high structural stability also inhibits a side reaction caused by contact between an electrolyte and a fresh surface exposed due to the secondary particle cracking, thereby reducing consumption of reversible lithium ions, inhibiting an increase in electrode impedance, and improving a cycling capacity retention rate of the battery at a high temperature, that is, improving the high-temperature cycling performance of the battery.

The positive electrode active material in this application helps ensure relatively high capacity performance, energy density, and high-temperature cycling, performance of the lithium-ion secondary battery. The lithium-ion secondary battery is applied to an electric vehicle, ensuring a long recharge mileage for the electric vehicle.

In some optional embodiments, the doping element is uniformly distributed in the secondary particles. Further, a relative deviation of a local mass concentration of the doping element in the secondary particles may be less than 32%, optionally less than 30%, and further optionally less than 20%, 16%, 15%, 13%, 12%, or 10%.

In this specification, the local mass concentration of the doping element in the secondary particles is a mass concentration of the doping element in all elements in a finite volume element at any selected site in the secondary particles, and can be obtained by testing element concentration distribution using energy dispersive X-ray spectroscopy (EDX) element analysis or EDS element analysis in combination with transmission electron microscope (TEM) or scanning electron microscope (SEM) single-point scanning, or through another similar method. When testing is performed using EDX or EDS element analysis in combination with TEM or SEM single-point scanning, mass concentrations of the doping element measured in μg/g at different sites in the secondary particles are respectively denoted as $\eta_1, \eta_2, \eta_3, \ldots, \eta_n$, where n is a positive integer greater than 15.

An average mass concentration of the doping element in the secondary particles is a mass concentration of the doping element in all elements within a range of a single secondary particle, and can be obtained by testing element concentration distribution through EDX or EDS element analysis in combination with TEM or SEM plane scanning, or through the another similar method. When testing is performed in the manner of testing the element concentration distribution through the EDX or EDS element analysis in combination with the TEM or SEM plane scanning, a tested plane includes all points in the foregoing :single-point testing. The average mass concentration of the doping element in the secondary particles is denoted as $\bar{\eta}$ in μg/g.

A relative deviation a of a local mass concentration of the doping element in the secondary particles is calculated according to the following formula (1):

$$\sigma = \frac{\max\{|\eta_1 - \bar{\eta}|, |\eta_2 - \bar{\eta}|, |\eta_3 - \bar{\eta}|, \ldots, |\eta_n - \bar{\eta}|\}}{\bar{\eta}} \quad \text{Formula (1)}$$

The relative deviation of the local mass concentration of the doping element in the secondary particles is less than 30%, and optionally less than 20%. This indicates that the doping element is highly uniformly distributed in the secondary particles. Uniform doping causes properties to be consistent at different sites in the particles, and lattices of the primary particles to have relatively consistent shrinkage changes along the a-axis direction, and relatively consistent expansion changes along the c-axis direction. Therefore, the doping element can better improve structural stability of the positive electrode active material, thereby effectively preventing the particles from cracking. In addition, migration and diffusion capabilities of lithium ions in different internal zones of uniformly doped particles are at a same level, and portions of the particles have similar deformation resistance capabilities, so that internal stresses of the particles are evenly distributed, thereby improving the structural stability of the positive electrode active material and preventing cracks. Therefore, the extractable capacity and high-temperature cycling performance of the positive electrode active material are improved, thereby improving the capacity performance, energy density, and high-temperature cycling performance of the lithium-ion secondary battery.

A smaller relative deviation of the local mass concentration of the doping element in the secondary particles means a more even distribution of the doping element in the secondary particles, and better extractable capacity and high-temperature cycling performance of the positive electrode active material.

In some optional embodiments, a true doping concentration φ of the positive electrode active material satisfies 1500 μg/cm³≤φ≤60000 μg/cm³. Optionally, 2300 μg/cm³≤φ≤49000 μg/cm³. Further optionally, 3000 μg/cm³≤φ≤30000 μg/cm³, 14820 μg/cm³≤φ≤30000 μg/cm³, 14820 μg/cm³≤φ≤25500 μg/cm³, or 24900 μg/cm³≤φ≤25500 μg/cm³.

In this specification, the true doping concentration φ of the positive electrode active material can be calculated according to the following formula (2):

$$\varphi = \omega \times \rho_{true} \quad \text{Formula (2)}$$

In the formula (2), φ is the true doping concentration of the positive electrode active material, measured in μg/cm³.

Herein, $\rho_{true}$ is a true density of the positive electrode active material, measured in g/cm³, and is equal to a ratio of a mass of the positive electrode active material to a true volume of the positive electrode active material. The true volume is a true volume of a solid substance, excluding pores inside granules. Herein, $\rho_{true}$ can be determined by using instruments and methods well-known in the art, for example, using a gas volume method, where a powder true densitometer may be used.

Herein, ω is a mass concentration of the doping element in the positive electrode active material, measured in μg/g, that is, a mass of the doping element contained per grain of the positive electrode active material. Herein, ω represents a percentage of doping element in the global macroscopic positive electrode active material, including doping element distributed into the secondary particles of the positive, electrode active material, doping element gathered in another phase on a surface of the positive electrode active material, and doping element located between particles of the positive electrode active material. Herein, ω can be determined through an absorption spectrum of a positive electrode active material solution, such as. inductively coupled plasma-optical emission spectrometer (ICP-OES) or X-ray absorption fine, structure (XAFS) spectroscopy When the true doping concentration of the positive electrode active material is within the foregoing range, the positive electrode active material can have a good layered crystal structure, and lattice stability of the primary particles can be improved, to effectively prevent the secondary particles from cracking. In addition, the positive electrode active material can provide a good carrier for delithiation of the lithium ions, to facilitate intercalation and deintercalation of the lithium ions and prevent reversible lithium ions from being consumed on a surface of an electrode or in the electrolyte, so that the positive electrode active material has a relatively high initial capacity and cycling capacity retention rate and the battery has a relatively high energy density and cycling performance.

In addition, when the true doping concentration of the positive electrode active material is within the foregoing range, the doping element tends to enter a transition metal layer, which ensures that the particles have a high lithium ion transmission capacity, so that the battery has a relatively high extractable capacity and cycling performance.

In some optional embodiments, the true density $\rho_{true}$ of the positive electrode active material satisfies 4.6 g/cm³≤$\rho_{true}$≤4.9 g/cm³. The positive electrode active material can have a relatively high specific capacity, thereby improving the capacity performance and the energy density of the battery.

In some optional embodiments, a deviation ε of a mass concentration ω of the doping element in the positive electrode active material relative to an average mass concentration $\bar{\eta}$ of the doping element in the secondary particles satisfies ε<50%. Optionally, ε≤41%. Further optionally, ε≤30%. Further, ε≤20% or ε≤12%.

Herein, ε can be calculated according to the following formula (3):

$$\varepsilon = \frac{|\omega - \bar{\eta}|}{\omega} \quad \text{Formula (3)}$$

ε of the positive electrode active material is within the foregoing range, meaning that doping element is successfully doped into the secondary particles, there is a small amount of doping element distributed in other phases on the surfaces of the secondary particles and doping element embedded in gaps between the particles of the positive electrode active material. The positive electrode active material has good macroscopic and microscopic uniformity, and a uniform structure. In a charging and discharging cycling process, swelling and shrinkage degrees of particles remain consistent, and the particles have high stability; so that the positive electrode active material has relatively high extractable capacity and high-temperature cycling performance.

In the positive electrode active material in the embodiments of this application, the doping element may be a first doping element doping a transition metal site of the nickel-containing lithium composite oxide, a second doping element doping an oxygen site of the nickel-containing lithium composite oxide, or a first doping element doping a transition metal site of the nickel-containing lithium composite oxide and a second doping element doping an oxygen site of the nickel-containing lithium composite oxide.

In other words, by doping at the transition metal site, the oxygen site, or the transition metal site and the oxygen site of the nickel-containing lithium composite oxide, the extractable capacity and high-temperature cycling performance of the positive electrode active material can be improved. When the positive electrode active material includes the first doping element and the second doping element, the extractable capacity and high-temperature cycling, performance of the positive electrode active material can be better improved. The capacity performance, energy density, and high-temperature cycling performance of the lithium-ion secondary battery using the positive electrode active material can be further improved.

In this specification, when the positive electrode active material includes the first doping element and the second doping element, a relative deviation a of the local mass concentration of the doping element in the secondary particles and the true doping concentration φ of the positive electrode active material are both calculated based on the first doping element and the second doping element.

The first doping element doping the transition metal site of the nickel-containing lithium composite oxide may be selected from one or more of transition metal elements other than nickel, and elements in Group IIA to Group VIA other than carbon, nitrogen, oxygen, and sulfur. Optionally, the first doping element has a relatively large effective ion radius. After entering the positive electrode active material, the first doping element with a relatively large effective ion radius can more effectively support a lattice structure of the positive electrode active material, and reduce the shrinkage rate of the lattice of the primary particles along the a-axis direction and the swelling rate of the lattice of the primary particles along the c-axis direction, thereby improving structural stability of the positive electrode active material and preventing the secondary particles from cracking.

In some embodiments, when the positive electrode active material is charged from the 11% delithiated state to the 78% delithiated state at a rate of 0.1 C, the first doping element in an oxidation state has a valence higher than or equal to +3, and optionally higher than +3. For example, the first doping element in the oxidation state has one or more of valences of +4, +5, +6, +7, and +8, and for another example, one or more of +5, +6, +7, and +8. The first doping element can provide more electrons during charging/discharging, to support a positive electrode in releasing more lithium ions, thereby increasing the charging/discharging voltage and extractable capacity of the lithium-ion secondary battery, so that the energy density of the battery is improved.

In addition, a first doping element in a high-valence state has a strong ability to bond with oxygen, helping improve the lattice stability of the primary particles and the structural stability of the positive electrode active material, thereby improving the high-temperature cycling performance of the battery.

In some embodiments, the first doping element may be selected from one or more of Si, Ti, V, Ge, Se, Zr, Nb, Ru, Pd Rh, Sb, Te, Ce, and W. Optionally, the first doping element may include one or more of Ti, Nb, Ru, Sb, Te, and W. An appropriate first doping element can better implement the foregoing effects, so that the lithium-ion secondary battery has relatively high energy density and good room-temperature and high-temperature cycling performance.

A second doping element doping an oxygen site of the nickel-containing lithium composite oxide may be selected from one or more of F, N, P, and S. After entering the positive electrode active material, the second doping element can also effectively support a lattice structure of the positive electrode active material, and reduce the shrinkage rate of the lattice of the primary particles along the a-axis direction and the swelling rate of the lattice of the primary particles along the c-axis direction, thereby improving structural stability of the positive electrode active material, preventing the secondary particles from cracking, and improving the high-temperature cycling performance of the lithium-ion secondary battery. Optionally the second doping element includes F.

In some embodiments, a molar percentage of nickel in elements at the transition metal site of the nickel-containing lithium composite oxide may be optionally 50% to 95%, and further optionally 50% to 90% or 60% to 90%. The positive electrode active material has a better specific capacity characteristic, further improving the capacity performance and energy density of the positive electrode active material.

In some optional embodiments, when the molar percentage of nickel in the elements at the transition metal site of the nickel-containing lithium composite oxide is 50% to 60% and the positive electrode active material is charged from an 11% delithiated state to a 78% delithiated state at a rate of 0.1 C, a lattice of the primary particles has a maximum shrinkage rate satisfying $\Delta a_{max} \leq 2.69\%$ in an a-axis direction, and a maximum swelling rate satisfying $\Delta c_{max} \leq 2.75\%$ in a c-axis direction. Optionally. $\Delta a_{max} \leq 2.3\%$. Further, $\Delta a_{max} \leq 2\%$ or $\leq 1.84\%$. Optionally, $\Delta c_{max} \leq 2.5\%$. Further, $\Delta c_{max} \leq 2.24\%$. When the molar percentage of nickel in the elements at the transition metal site of the nickel-containing lithium composite oxide is 50% to 60%, $\Delta a_{max}$ and $\Delta c_{max}$ of the positive electrode active material are within the foregoing range, to further improve the structural stability and the capacity thereby further improving the energy density and the high-temperature cycling performance of the battery using the positive electrode active material.

In some other optional embodiments, when a molar percentage of nickel in elements at a transition metal site of the nickel-containing lithium composite oxide is greater than 60% and less than or equal to 90% and the positive electrode active material is charged from an 11% delithiated state to a 78% delithiated state at a rate of 0.1 C, a lattice of the primary particles has a maximum shrinkage rate satisfying $\Delta a_{max} \leq 2.85\%$ in an a-axis direction, and a maximum swelling rate satisfying $\Delta a_{max} \leq 2.93\%$ in a c-axis direction. Optionally, $\Delta a_{max} \leq 2.77\%$. Further, $\Delta a_{max} \leq 2.72\%$, 2.5%, or 2.3%. Optionally, $\Delta c_{max} \leq 2.84\%$. Further, $\Delta c_{max} \leq 2.65\%$, 2.57%, 2.51%, 2.43%, or 7.39%. When the molar percentage of nickel in the elements at the transition metal site of the nickel-containing lithium composite oxide is greater than 60% and less than or equal to 90%, $\Delta a_{max}$ and $\Delta c_{max}$ of the positive electrode active material are within the foregoing range, which can further improve the structural stability and the capacity, and further improve the energy density and high-temperature cycling performance of the battery.

In some examples, the nickel-containing lithium composite oxide may satisfy a chemical formula $Li_{1+m}[Ni_xCo_yMn_zM_p]O_{2-q}X_q$, where M and X are doping elements, M is for doping at the transition metal site, X is the doping element at the oxygen site, $0.5 \leq x < 1$, $0 \leq y < 0.3$, $0 \leq z < 0.3$, $-0.1 \leq m < 0.2$, $0 \leq p < 0.3$, $0 \leq q < 0.2$, $x+y+z+p=1$, and p and q are not 0 simultaneously. The positive electrode active material has a high specific capacity and structural stability, so that the lithium-ion secondary battery has high capacity performance and energy density and good room-temperature and high-temperature cycling performance.

Optionally, $0 < y < 0.3$ and $0 < z < 0.3$. The ternary positive electrode active material has a high energy density and good structural stability, and therefore, the battery has a high energy density and long cycling life.

Optionally M is selected from one or more of Si, Ti, V, Ge, Se, Zr, Nb, Ru, Pd, Rh, Sb, Te, Ce, and W. Further optionally M includes one or more of Ti, Nb, Ru, Sb, Te, and W. Because the doping element M has a relatively high valence in an oxidation state, which exceeds an average valence (+3) of transition metals Ni, Co, and Mn in the high-nickel ternary positive electrode active material, this means that these doping elements can provide more electrons during the charging process, enabling the positive electrode active material to release more lithium ions, to increase the charging/discharging voltage and extractable capacity of the lithium-ion secondary battery so that the lithium-ion secondary battery has higher capacity performance and energy density. The lattice stability of the primary particles of the positive electrode active material can be effectively improved by using the doping element, so that the positive electrode active material has relatively high structural stability and is not prone to cracking, thereby improving the cycling performance of the battery.

Optionally, X can be selected from one or more of F, N, P, and S. For example, X includes F. The doping element X at the oxygen site can improve the structural stability of the positive electrode active material and reduce side reactions on the surfaces of the particles, thereby improving the capacity performance, energy density, and high-temperature cycling performance of the lithium-ion secondary battery.

Optionally, neither p nor q is 0.

In some other examples, the nickel-containing lithium composite oxide satisfies a chemical formula $Li_{1+n}[Ni_{r-d}Co_sMn_tM'_d]O_{2-v}X'_v$, where M' and X' are doping elements, M' partially replaces nickel in a transition metal layer, and X' is a doping element at an oxygen site; $0.5 \leq r-d < 1$, $0 \leq s < 0.3$, $0 \leq t < 0.3$, $-0.1 \leq n < 0.2$, $0 \leq d < 0.3$, $0 \leq v < 0.2$, $r+s+t=1$, and d and v are not 0 simultaneously. The positive electrode active material has a high specific capacity and structural stability, so that the lithium-ion secondary battery has high capacity performance and energy density, and good room-temperature and high-temperature cycling performance.

Optionally, $0<s<0.3$ and $0<t<0.3$. The ternary positive electrode active material has a high energy density and good structural stability, and therefore, the battery has a high energy density and long cycling life.

Optionally M' is selected from one or more of Si, Ti, Ge, Se, Zr, Nb, Ru, Pd, Rh, Sb, Te. Ce, and W. Further optionally, M' includes one or more of Ti, Nb, Ru, Sb, Te, and W. Likewise, the lithium-ion secondary battery has higher capacity performance, energy density, and high-temperature cycling performance.

Optionally, X' can be selected from one or more of F, N, P, and S. For example, X' includes F. Similarly, the doping element enables the lithium-ion secondary battery to have relatively high capacity performance, energy density, and room, temperature and high-temperature cycling performance.

Optionally, neither d nor v is 0.

The various nickel-containing lithium composite oxides in the foregoing examples can be independently used for the positive electrode active material, or a combination of any two or more of the nickel-containing lithium composite oxides can be used for the positive electrode active material.

In the embodiments of this application, a volume average particle size $D_v50$ of the positive electrode active material may be 5 μm to 20 μm, further optionally 8 μm to 15 μm, and further optionally 9 μm to 11 μm. When $D_v50$ of the positive electrode active material is within the foregoing range, migration paths of lithium ions and electrons in the material are relatively short, which can further improve transmission and diffusion performance of the lithium ions and the electrons in the positive electrode active material, reduce polarization of the battery, and improve the cycling performance and rate performance of the lithium-ion secondary battery. In addition, the positive electrode active material can have a relatively high compacted density, thereby improving the energy density of the battery.

$D_v50$ of the positive electrode active material is within the foregoing range, which also helps reduce side reactions of the electrolyte on the surface of the positive electrode active material and reduce agglomeration between particles in the positive electrode active material, thereby improving the room-temperature and high-temperature cycling performance and safety performance of the positive electrode active material.

In the embodiments of this application, a specific surface area of the positive electrode active material may be optionally 0.2 $m^2/g$ to 1.5 $m^2/g$ and further optionally 0.3 $m^2/g$ to 1 $m^2/g$. The specific surface area of the positive electrode active material is within the foregoing range, ensuring that the positive electrode active material has a relatively high active specific surface area, helping reduce the side reactions of the electrolyte on the surface of the positive electrode active material, and improving an extractable capacity and cycling life of the positive electrode active material. In addition, agglomeration between the particles in the positive electrode active material in the slurry preparation, charging, and discharging processes can be suppressed, thereby improving the energy density and cycling performance of the battery.

In the embodiments of this application, tap density of the positive electrode active material is optionally 2.3 $g/cm^3$ to 2.8 $g/cm^3$. The tap density of the positive electrode active material is within the foregoing range, enabling the lithium-ion secondary battery to have relatively high capacity performance and energy density.

In the embodiments of this application, compacted density of the positive electrode active material under a pressure of 5 tons (equivalent to 49 kN) is optionally 3.1 $g/cm^3$ to 3.8 $g/cm^3$. The compacted density of the positive electrode active material is relatively high, enabling the lithium-ion secondary battery to have relatively high capacity performance and energy density.

Optionally, a shape of the positive electrode active material in the embodiments of this application is one or more of a spherical shape and a spheroidal shape.

In this specification, $D_v50$ of the positive electrode active material has a definition well known in the art, is also referred to as a median particle size, and indicates a particle size corresponding to 50% of volume distribution of the particles in the positive electrode active material. The average particle size $D_v50$ of the positive electrode active material can be tested using instruments and methods well known in the art, for example, may be conveniently tested by using a laser particle size analyzer (such as Mastersizer 3000 of Malvern Instruments, UK).

The specific surface area of the positive electrode active material has a definition well known in the art, and can be determined by using instruments and methods well known in the art, for example, tested by using a nitrogen-adsorption specific surface area test method and calculated by using a BET (Brunauer Emmett Teller) method. The nitrogen-adsorption specific surface area test can be performed by using a NOVA 2000e specific surface area and aperture analyzer of Cantel Medical, USA. In a specific example, a test method is as follows: 8.000 g to 15.000 g of the positive electrode active material is put into a weighed empty sample tube, the positive electrode active material is stirred and weighed, the sample tube is put in a NOVA 2000e degassing station for degassing, a total mass of the degassed positive electrode active material and the sample tube is weighed, and a mass G of the degassed positive electrode active material is calculated by subtracting the mass of the empty sample tube from the total mass. The sample tube is put into NOVA 2000e, an adsorption amount of nitrogen on the surface of the positive electrode active material under different relative pressures is determined, an adsorption amount at a monomolecular layer is calculated based on the Brunauer-Emmett-Teller multilayer adsorption theory and an equation thereof, a total surface area A of the positive electrode active material is calculated, and a specific surface area of the positive electrode active material is calculated according to A/G.

The tap density of the positive electrode active material has a definition well known in the art, and can be determined by using instruments and methods well known in the art, for example, conveniently determined by using a tap density meter (such as FZS4-4B).

The compacted density of the positive electrode active material has a definition well known in the art, and can be determined by using instruments and methods well known in the art, for example, conveniently determined by using an electronic pressure tester (such as UTM7305).

The following describes a preparation method of a positive electrode active material by using an example. Any one of the foregoing positive electrode active materials can be prepared according to the preparation method. The preparation method includes:

mixing a precursor of the positive electrode active material, lithium source, and a precursor of the doping element, and performing sintering treatment, to obtain the positive electrode active material.

The precursor of the positive electrode active material may be one or more of oxides, hydroxides and carbonates that contain Ni and optionally Co and/or Mn in a stoichiometric ratio, for example, hydroxides containing Ni, Co and Mn in a stoichiometric ratio.

The precursor of the positive electrode active material can be obtained by using a method well known in the art, for example, prepared by using a co-precipitation method, a gel method, or a solid phase method.

In an example, a Ni source, a Co source, and a Mn source are dispersed in a solvent to obtain a mixed solution; the mixed solution, a strong-alkali solution, and a complexing agent solution are simultaneously pumped into a reactor with a stirring function through continuous co-current reactions, where a pH value of a reaction solution is controlled to be 10 to 13, the temperature in the reactor is 25° C. to 90° C., and an inert gas is introduced for protection during the reaction; after the reaction is completed, aging, filtration, washing, and vacuum drying are performed to obtain hydroxides containing Ni, Co and Mn.

The Ni source can be a soluble nickel salt, for example, one or more of nickel sulfate, nickel nitrate, nickel chloride, nickel oxalate, and nickel acetate; for another example, one or more of nickel sulfate and nickel nitrate; for another example, nickel sulfate. The Co source may be soluble cobalt salt, for example, one or more of cobalt sulfate, cobalt nitrate, cobalt chloride, cobalt oxalate, and cobalt acetate; for another example, one or more of cobalt sulfate and cobalt nitrate; for another example, cobalt sulfate. The Mn source: may be soluble manganese salt, for example, one or more of manganese sulfate, manganese nitrate, manganese chloride, manganese oxalate, and manganese acetate; for another example, one or more of manganese sulfate and manganese nitrate; for another example, manganese sulfate.

The strong alkali may be one or more of LiOH, NaOH, and KOH. For example, the strong alkali is NaOH. The complexing agent may be one or more of ammonia, ammonium sulfate, ammonium nitrate, ammonium chloride, ammonium citrate, and disodium ethylenediammetetraacetic acid (EDTA). For example, the complexing agent is ammonia.

There is no special limitation on the solvents of the mixed solution, the strong-alkali solution, and the complexing agent solution. For example, the solvents of the mixed solution, the strong-alkali solution, and the complexing agent solution are each independently one or more of deionized water, methanol, ethanol, acetone, isopropanol, and n-hexanol. For example, the solvents are the deionized water.

The inert gas introduced during the reaction is, for example, one or more of nitrogen, argon, and helium.

The lithium source can be one or more of lithium oxide ($Li_2O$), lithium phosphate ($Li_3PO_4$), lithium dihydrogen phosphate ($LiH_2PO_4$), lithium acetate ($CH_3COOLi$), lithium hydroxide (LiOH), lithium carbonate ($Li_2CO_3$), and lithium nitrate ($LiNO_3$). Further, the lithium source is one or more of lithium carbonate, lithium hydroxide, and lithium nitrate. Furthermore, the lithium source is lithium carbonate.

The precursor of the doping element may include one or more of a precursor of a first doping element and a precursor of a second doping element.

The precursor of the first doping element may be one or more of an oxide, a nitric acid compound, a carbonic acid compound, a hydroxide compound, and an acetic acid compound of the first doping element. For example, the precursor of the first doping element is the oxide of the first doping element, such as one or more of a silicon oxide (such as $SiO_2$ and SiO), a titanium oxide (such as $TiO_2$ and TiO), a vanadium oxide (such as $V_2O_5$, $V_2O_4$, and $V_2O_3$), a germanium oxide (such as ($GeO_2$) a selenium oxide (such as $SeO_2$), a zirconium oxide (such as $ZrO_2$), a niobium oxide (such as $Nb_2O_5$ and $NbO_2$), a ruthenium oxide (such as $RuO_2$), a palladium oxide (such as PdO), a rhodium oxide (such as $Rh_2O_3$), an antimony oxide (such as $Sb_2O_5$ and $Sb_2O_3$), a tellurium oxide (such as $TeO_2$), a cerium oxide (such as $CeO_2$), and a tungsten oxide (such as $WO_2$ and $WO_3$).

The precursor of the second doping element may be one or more of ammonium fluoride, lithium fluoride, hydrogen fluoride, elemental phosphorus, phosphorus oxide, ammonium dihydrogen phosphate, ammonium metaphosphate, ammonium dihydrogen phosphite, ammonium nitrate, ammonium nitrite, ammonium carbonate, ammonium bicarbonate, ammonium sulfate, ammonium bisulfate, ammonium bisulfite, ammonium sulfite, ammonium hydrosulfide, hydrogen sulfide, lithium sulfide, ammonium sulfide, and elemental sulfur.

The precursor of the positive electrode active material, the lithium source, and the precursor of the doping element can be mixed by using a ball mill mixer or a high-speed mixer. The mixture is added into an atmosphere sintering furnace for sintering. A sintering atmosphere is an oxygen-containing atmosphere, for example, an air atmosphere or an oxygen atmosphere. The sintering temperature is, for example, 600° C. to 1000° C. Optionally, the sintering temperature is 700° C. to 900° C., so that the doping element has relatively high distribution uniformity. The sintering duration can be adjusted based on an actual situation, for example, 5 h to 25 h, or for another example, 10 h to 20 h.

It should be noted that during the preparation of the positive electrode active material, there are a plurality of theoretically feasible manners to control formation of the secondary particles and control a swelling degree of the lattice during the charging process, such as a shape of the precursor of the positive electrode active material, a pH value of a reaction solution during the preparation of the precursor of the positive electrode active material, a mixing, speed and reaction time of lye and a salt solution, and a sintering temperature, sintering duration, sintering times, a type of doping element, an amount of doping, and uniformity of the doping during the preparation of the positive electrode active material. In this application, some measures of a doping method for solid-phase sintering are listed. Through manners of adjusting the sintering times, doping the doping element in batches, controlling overall sintering duration and the sintering temperature, and the like, positive electrode active: materials with different $\Delta a_{max}$ and $\Delta c_{max}$ are obtained. It should be understood that the methods described in this specification are merely intended to interpret this application, but not to limit this application.

In an example, the precursor of the doping element can be divided into L batches for doping with the doping element, where L can be 1 to 5, for example, 2 to 3. In these embodiments, the preparation method the positive electrode active material may include the following steps: mixing the precursor of the positive electrode active material, the lithium source, and a first batch of precursor of the doping element, and performing a first sintering treatment; mixing a product of the first sintering treatment with a second batch of precursor of the doping element, performing a second sintering treatment, and so on, until a product of an $(L-1)^{th}$ sintering treatment is mixed with an $L^{th}$ batch of precursor of the doping element, and an $L^{th}$ sintering treatment is performed to obtain the positive electrode active material.

The precursor of the doping element can be equally divided into L parts or randomly divided into L parts to perform doping in L batches.

Temperatures of sintering treatments are the same or different. Duration of the sintering treatments is the same or different. A person skilled in the art can adjust the sintering temperature and duration according to the type and amount of doping element. For example, the temperature of each sintering treatment may be 600° C. to 1000° C., for example, 700° C. to 900° C., and for another example, 800° C. to 850° C. Duration of each sintering treatment may be 3 h to 20 h, for example, 5 h to 15 h. The total sintering duration may be 5 h to 25 h, for example, 10 h to 20 h.

During the doping process, for example, the sintering temperature and/or the sintering duration can be increased or extended within a specified range to improve doping uniformity.

In some embodiments, a sintered product may alternatively be crushed and sieved, to obtain a positive electrode active material with an optimized particle size distribution and specific surface area. There is no special limitation on a crushing method, which may be selected according to an actual need. For example, a particle crusher is used.

A preferred technical feature of the positive electrode active material described in this application is also applicable to the preparation method the positive electrode active material in this application, and a corresponding technical effect is obtained. Details are not described herein again.

Positive Electrode Plate

This application provides a positive electrode plate that uses any one or more of the positive electrode active materials in this application.

Because the positive electrode plate in the embodiments of this application uses the positive electrode active material in this application, a lithium-ion secondary battery using the positive electrode plate can have both good room-temperature and high-temperature cycling performance and relatively high energy density.

Specifically, the positive electrode plate includes a positive electrode current collector, and a positive electrode active substance layer disposed on at least one surface of the positive electrode current collector. For example, the positive electrode current collector includes two opposite surfaces in its thickness direction, and the positive electrode active substance layer is disposed on either or both of the two surfaces of the positive electrode current collector.

The positive electrode active substance layer includes the positive electrode active material in this application.

In addition, the positive electrode active substance layer may further include a conductive agent and a binder. Types of the conductive agent and the binder in the positive electrode active substance layer are not specifically limited in this application, and the conductive agent and the binder may be selected based on an actual need.

In an example, the conductive agent may be one or more of graphite, superconducting carbon, acetylene black, carbon black, Ketjen black, carbon dots, carbon nanotubes, graphene, and carbon nanofibers. The binder may be one or more of styrene-butadiene rubber (SBR), water-borne acrylic resin (water-based acrylic resin), carboxymethyl cellulose (CMC), polyvinylidene fluoride (PVDF), polytetrafluoroethylene (PTFE), polyvinyl butyral (PVB), ethylene vinyl acetate (EVA), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer, fluorine-containing acrylic resin, and polyvinyl alcohol (PVA).

The positive electrode current collector may be a metal foil or a porous metal plate with good conductivity and mechanical property, and a material of the positive electrode current collector may be one or more of aluminum, copper, nickel, titanium, silver, and their respective alloys. The positive electrode current collector is, for example, aluminum foil.

The positive electrode plate may be prepared by using a conventional method in the art. For example, the positive electrode active material, the conductive agent, and the binder are dispersed in a solvent, where the solvent may be N-methylpyrrolidone (NMP) or deionized water, to form a uniform positive electrode slurry. The positive electrode slurry is applied on the positive electrode current collector, and processes such as drying and roll-in are performed to obtain the positive electrode plate.

Lithium-Ion Secondary Battery

The application provides a lithium-ion secondary battery that includes a positive electrode plate, a negative electrode plate, a separator, and an electrolyte. The positive electrode plate is any positive electrode plate in this application.

Because the lithium-ion secondary battery uses the positive electrode plate in this application, the lithium-ion secondary battery can have both good room-temperature and high-temperature cycling performance and relatively high energy density.

The foregoing negative electrode plate may be a metal lithium plate.

The foregoing negative electrode plate may include a negative electrode current collector, and a negative electrode active substance layer disposed on at least one surface of the negative electrode current collector. For example, the negative electrode current collector includes two opposite surfaces in its thickness direction, and the negative electrode active substance layer is disposed on either or both of the two surfaces of the negative electrode current collector.

The negative electrode active substance layer includes a negative electrode active material. A type of the negative electrode active material is not specifically limited in the embodiments of this application, and the negative electrode active material may be selected based on an actual need. In an example, the negative electrode active material may be one or more of natural graphite, artificial graphite, mesocarbon microbeads (MCMB), hard carbon, soft carbon, silicon, a silicon-carbon composite, $SiO_m$ ($0<m<2$, for example, m=1), a Li—Sn alloy, a Li—Sn—O alloy, Sn, SnO, $SnO_2$, lithium titanate $Li_4Ti_5O_{12}$ with a spinel-structure, a Li—Al alloy and metal lithium.

The negative electrode active substance layer may further include a conductive agent and a binder. Types of the conductive agent and the binder in the negative electrode active substance layer are not specifically limited in the embodiments of this application, and the conductive agent and the binder may be selected based on an actual need. In an example, the conductive agent is one or more of graphite, superconducting carbon, acetylene black, carbon black, Ketjen black, carbon dots, carbon nanotubes, graphene, and carbon nanofibers. The binder is one or more of styrene-butadiene rubber (SBR), polyvinylidene fluoride (PVDF), polytetrafluoroethylene (PTFE) polyvinyl butyral (PVB), and water-based acrylic resin (water-based acrylic resin).

Optionally, the negative electrode active substance layer may further include a thickener, for example, sodium carboxymethyl cellulose (CMC-Na).

The negative electrode current collector may be a metal foil or a porous metal plate with good conductivity and mechanical property, and a material of the negative electrode current collector may be one or more of copper, nickel, titanium, iron, and their respective alloys. The negative electrode current collector is, for example, copper foil.

The negative electrode plate may be prepared by using a conventional method in the art. For example, the negative electrode active material, the conductive agent, the binder, and the thickener are dispersed in a solvent, where the solvent might be N-methylpyrrolidone (NMP) or deionized water, to form a uniform negative electrode slurry. The negative electrode slurry is applied on the negative electrode current collector, and processes such as drying and roll-in are performed to obtain the negative electrode plate.

In the lithium-ion secondary battery in the embodiments of this application, the electrolyte may be a solid electrolyte, for example, a polymer electrolyte or an inorganic solid electrolyte, but is not limited thereto. A liquid electrolyte may also be used as the electrolyte. The liquid electrolyte includes a solvent and a lithium salt dissolved in the solvent.

The solvent may be a non-aqueous organic solvent, for example, one or more, for example, at least two, of ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), Methylmethyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB).

The lithium salt may be one or more of $LiPF_6$ (lithium hexafluorophosphate), $LiBF_4$ (lithium tetrafluoroborate), $LiClO_4$ (lithium perchlorate), $LiAsF_6$ (lithium hexafluoroborate), LiFSI (lithium bis(fluorosulfonyl)bisfluorosulfonyl imide), LiTFSI (lithium bis-trifluommmethanesulfonimidetrifluoromethanesulfon imide), LiTFS (lithium trifluoromethanesulfonat), LiDFOB (lithium difluorooxalatoborate), LiBOB (lithium bisoxalatoborate), $LiPO_2F_2$ (lithium tetrafluoro oxalate phosphate), LiDFOP (lithium difluorophosphate), and LiTFOP (lithium tetrafluoro oxalate phosphate). For example, the lithium salt may be one or more of $LiPF_6$ (lithium hexafluorophosphate), $LiBF_4$ (lithium tetrafluoroborate), LiBOB (lithium bisoxalatoborate), LiDFOB (lithium difluorooxalatoborate), LiTFSI (lithium bis-trifluoromethanesulfonimidetrifluoromethanesulfon imide), and LiFSI (lithium bis(fluorosulfonyl)bisfluorosulfonyl imide).

Optionally, the electrolyte also contains another additive, for example, one or more of vinylene carbonate (VC), vinyl ethylene carbonate (VEC), fluoroethylene carbonate (FEC), difluoroethylene carbonate (DFEC), trifluoromethyl ethylene carbonate (TFPC), succinonitrile (SN), adiponitrile (ADN), glutamnitrile (GLN), hexanetricarbonitrile (HTN), 1,3-propane sultone (1,3-PS), ethylene sulfate (DTD), methylene methane disulfonate (MMDS), 1-propene-1,3-sultone (PST), 4-methyl ethylene sulfate (PCS), 4-ethyl ethylene sulfate (PBS), 4-propyl ethylene sulfate (PEGLST) propylene sulfate (TS), 1,4-butane sultone (1,4-BS), ethylene sulfite (DTO), dimethyl sulfite (DMS), diethyl sulfite (DES), sulfonate cyclic quaternary ammonium salt, tris(trimethylsilane) phosphate (TMSP), and tris(trimethylsilane) borate (TMSB), but is not limited thereto.

The lithium-ion secondary battery in the embodiments of this application imposes no particular limitation on the separator, and any well-known porous separator. with electrochemical stability and mechanical stability may be selected, for example, a mono-layer or multi-layer membrane of one or more of glass fiber, nonwoven fabric, polyethylene (PE), polypropylene (PP), and polyvinylidene fluoride (PVDF).

The positive electrode plate and the negative electrode plate are stacked alternately, and the separator is provided between the positive electrode plate and the negative electrode plate for separation, to obtain a battery cell, or a battery cell may be obtained through winding. The battery cell is placed in a housing, an electrolyte is injected, followed by sealing, to obtain the lithium-ion secondary battery.

Figure 4:
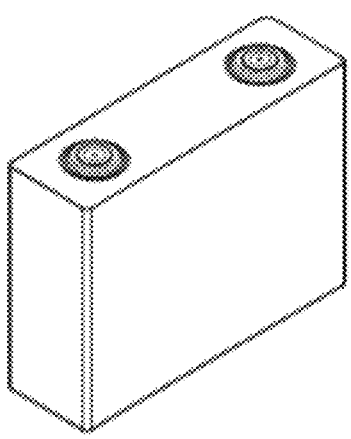
FIG. 4 is a schematic diagram of an embodiment of a lithium-ion secondary battery.

This application has no particular limitation on a shape of the lithium-ion secondary battery, and the lithium-ion battery may be cylindrical, square, or in any other shape. FIG. 4 shows a lithium-ion secondary battery 5 of a square structure as an example.

In some embodiments, the secondary battery may include an outer package. The outer package is used to package the positive electrode plate, the negative electrode plate, and an electrolyte.

Figure 5:
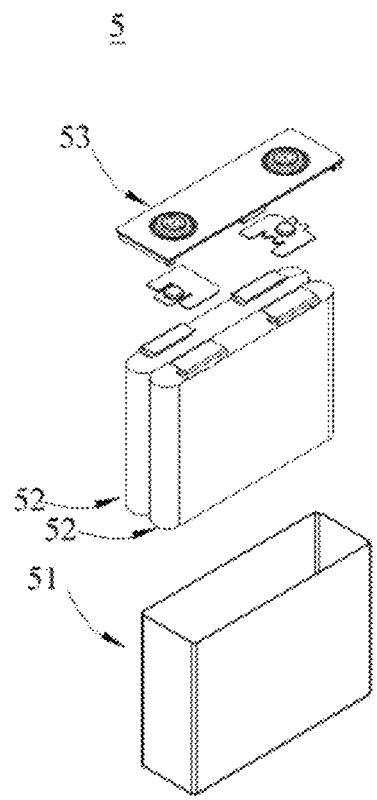
FIG. 5 is an exploded view of FIG. 4.

In some embodiments, referring to FIG. 5, the outer package may include a housing 51 and a cover plate 53. The housing 51 may include a bottom plate and a side plate connected to the bottom plate, and the bottom plate and the side plate are enclosed to form an accommodating cavity. The housing 51 has an opening communicating with the accommodating cavity, and the cover plate 53 can cover the opening, to seal the accommodating cavity.

The positive electrode plate, the negative electrode plate, and the separator may wound or laminated to form a jelly roll 52. The jelly roll 52 is packaged in the accommodating cavity. The electrolyte may be a liquid electrolyte, and the jelly roll 52 is infiltrated in the liquid electrolyte. The lithium-ion secondary battery 5 may contain one or more jelly rolls 52, which can be adjusted according to a requirement.

In some embodiments, the outer package of the lithium-ion secondary battery may be a hard shell, for example, a hard plastic shell, an aluminum shell, or a steel shell. Alternatively the outer package of the secondary battery may be a soft package, for example, a soft bag. A material of the soft package may be plastic, for example, may include one or more of polypropylene (PP), polybutylene terephthalate (PBT), polybutylene succinate (PBS), and the like.

In some embodiments, lithium-ion secondary batteries may be combined to assemble a battery module, and the battery module may include a plurality of lithium-ion secondary batteries. The specific quantity may be adjusted based on use and capacity of the battery module.

Figure 6:
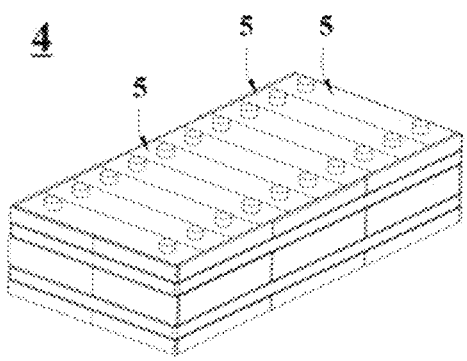
FIG. 6 is a schematic diagram of an embodiment of a battery module.

FIG. 6 shows a battery module 4 used as an example. Referring to FIG. 6, in the battery module 4, a plurality of lithium-ion secondary batteries 5 may be sequentially arranged along a length direction of the battery module 4. Certainly, the lithium-ion secondary batteries may be arranged in any other manner. Further, the plurality of lithium-ion secondary batteries 5 may be fixed by using fasteners.

Optionally, the battery module 4 may further include a housing with an accommodating space, and the plurality of lithium-ion secondary batteries 5 are accommodated in the accommodating space.

In some embodiments, such battery modules may be further combined to assemble a battery pack, and a quantity of battery modules included in the battery pack may be adjusted based on use and capacity of the battery pack.

Figure 7:
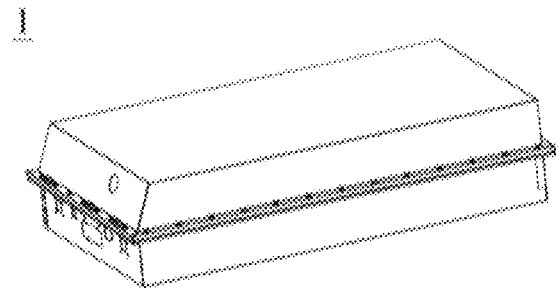
FIG. 7 is a schematic diagram of an embodiment of a battery pack.
Figure 8:
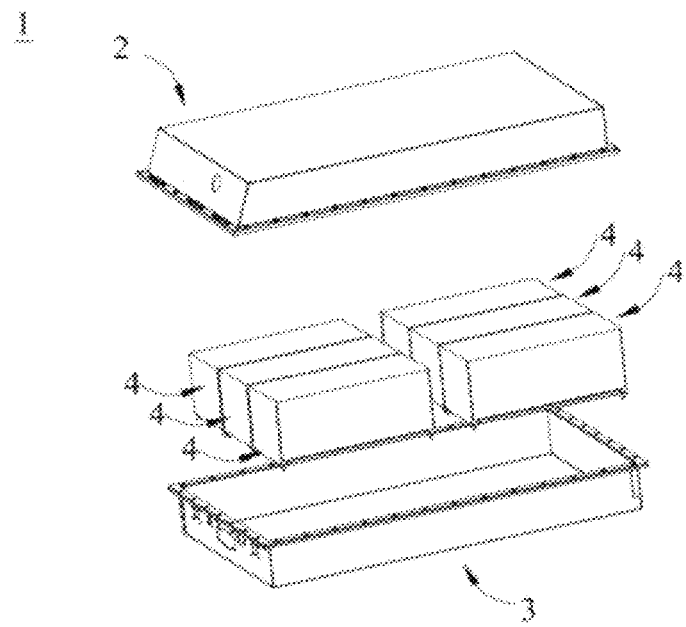
FIG. 8 is an exploded view of FIG. 7.

FIG. 7 and FIG. 8 show a battery pack 1 used as an example. Referring to FIG. 7 and FIG. 8, the battery pack 1 may include a battery box and a plurality of battery modules 4 disposed in the battery box. The battery box includes an upper box body 2 and a lower box body 3. The upper box body 2 can cover the lower box body 3 to form enclosed space for accommodating the battery modules 4. The plurality of battery modules 4 may be arranged in the battery box in any manner.

This application further provides an apparatus. The apparatus includes at least one of the lithium-ion secondary battery the battery module, or the battery pack according to this application. The lithium-ion secondary battery, the battery module, or the battery pack may be used as a power source of the apparatus, or an energy storage unit of the apparatus. The apparatus may be, but is not limited to, a mobile device (for example, a mobile phone or a notebook computer), an electric vehicle (for example, a full electric vehicle, a hybrid electric vehicle, a plug-in hybrid electric vehicle, an electric bicycle, an electric scooter, an electric golf vehicle, or an electric truck), an electric train, a ship, a satellite, an energy storage system, and the like.

A lithium-ion secondary battery, a battery module, or a battery pack may be selected for the apparatus according to requirements for using the apparatus.

Figure 9:
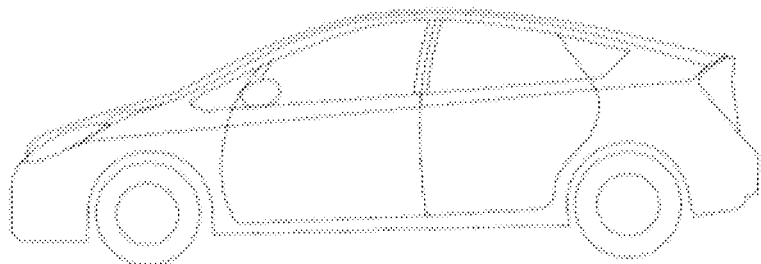
FIG. 9 is a schematic diagram of an embodiment of an apparatus using a lithium-ion secondary battery as a power supply.

FIG. 9 shows an apparatus used as an example. The apparatus is a battery electric vehicle, a hybrid electric vehicle, a plug-in hybrid electric vehicle, or the like. To meet a requirement of the apparatus for high power and high energy density of the secondary battery, a battery pack or a battery module may be used.

In another example, the apparatus may be a mobile phone, a tablet computer, a notebook computer, or the like. The apparatus is generally required to be light and thin, and may use a lithium-ion secondary battery as its power source.

EXAMPLES

Content disclosed in this application is described in detail in the following embodiments. These embodiments are intended only for illustrative purposes because various modifications and changes made without departing from the scope of the content disclosed in this application are apparent to those skilled in the art. Unless otherwise stated, all parts, percentages, and ratios reported in the following embodiments are based on weights, all reagents used in the embodiments are commercially available or synthesized in a conventional manner, and can be used directly without further processing, and all instruments used in the embodiments are commercially available.

Example 1

Preparation of a Positive Electrode Active Material

A doping element was Sb. A precursor, namely an antimony oxide ($Sb_2O_3$), of the doping element is roughly equally divided into two batches for doping of Sb. The preparation method includes:

A precursor, namely $[Ni_{0.8}Co_{0.1}Mn_{0.1}](OH)_2$, of the positive electrode active material, lithium hydroxide LiOH, and the first batch of antimony oxides were added to a high-speed mixer for mixing for 1 h, to obtain a mixture. A molar ratio of the precursor of the positive electrode active material to the lithium hydroxide Li/Me was 1.05, where Me represented total molar mass of Ni, Co, and Mn in the precursor of the positive electrode active material. The mixture was put into an atmosphere sintering furnace for the first sintering, a sintering temperature was 830° C., sintering duration was 8 h, and a sintering atmosphere was an oxygen-containing atmosphere with an $O_2$ concentration of 90%.

A product of the first sintering treatment and a second batch of antimony oxides were added to the high-speed mixer for mixing for 1 h, and the second sintering was performed. A sintering temperature and a sintering atmosphere were the same as those of the first sintering. Sintering duration was 10 h. That is, total sintering duration was 18 h.

A product of the second sintering treatment was crushed and sieved, to obtain a high-nickel ternary positive electrode active material. An amount of added antimony oxides satisfied that a true doping concentration of Sb in the positive electrode active material was 25140 μg/cm$^3$.

Preparation of an Electrolyte

After EC, DEC, and DMC were mixed in a volume ratio of 1:1:1, a solvent was obtained, and then a lithium salt $LiPF_6$ was dissolved in the solvent, to obtain the electrolyte. A concentration of $LiPF_6$ was 1 mol/L.

Preparation of a Button Battery

The prepared positive electrode active material, conductive carbon black and a binder PVDF were dispersed into a solvent of N-methylpyrrolidone (NMP) at a weight ratio of 90:5:5, and mixed evenly to obtain a positive electrode slurry. The positive electrode shiny was evenly applied on aluminum foil of the positive electrode current collector, followed by drying and cold pressing, to obtain a positive electrode plate.

In a button battery box, the positive electrode plate, a separator, and a metal lithium plate were stacked in sequence, and the electrolyte was injected, to obtain a button battery through assembly.

Preparation of a Full Battery

The prepared positive electrode active material, a conductive agent acetylene black, and a binder PVDF were dispersed in a solvent NMP at a weight ratio of 94:3:3, and mixed evenly to obtain a positive electrode slurry. The positive electrode slurry was evenly applied on aluminum foil of the positive electrode current collector, followed by drying and cold pressing, to obtain a positive electrode plate.

A negative electrode active material artificial graphite, hard carbon, a conductive agent acetylene black, a binder styrene, butadiene rubber (SBR), and a thickener sodium carboxymethyl cellulose (CMC-Na) were dispersed in deionized water at a weight ratio of 90:5:2:2:1, and were mixed evenly, to obtain a negative electrode slurry. The negative electrode slurry was evenly applied on aluminum foil of the negative electrode current collector, followed by drying and cold pressing, to obtain a negative electrode plate.

A polyethylene (PE) porous polymer film was used as the separator. The positive electrode plate, the separator, and the negative electrode plate were stacked in sequence, to obtain a bare cell, the bare cell was placed in an outer package, the foregoing electrolyte was injected, and the bare cell was packaged, to obtain the full battery.

Examples 2 to 13, Examples 16 to 20, and Comparative Examples 1 and 2

A difference from Example 1 was that related parameters in the preparation step of the positive electrode active material were changed, and the type of the mixed doping element an amount in each batch, the sintering temperature, and the total sintering duration were adjusted, to obtain a positive electrode active material with a predetermined doping element type, doping amount, and doping uniformity. For details, refer to Table 1.

In Embodiment 4 and Embodiment 5, a plurality of elements were used for doping, and the amounts of doping elements were basically the same.

Examples 14 and 15

A difference from Example 1 was that doping elements in Example 14 were added in one batch, and a sintering temperature was 720° C. and doping elements in Example 15 were added in one batch, and a sintering temperature was 680° C. For other parameters, refer to Table 1.

Examples 21 and 22

A difference from Example 1 was that in Example 21, a temperature of the first sintering was 750° C. and duration was 5 h, and a temperature of the second sintering was 600° C. and duration was 2 h. For other parameters, refer to Table 1.

A difference from Example 1 was that in Example 22, a temperature of the first sintering was 600° C. and duration was 3 h; and a temperature of the second sintering was 550° C. and duration was 2 h. For other parameters, refer to Table 1.

Examples 23 to 25 and Comparative Example 3

A difference from Example 1 was that a precursor of a positive electrode active material in Examples 23 to 25 was $[Ni_{0.5}Co_{0.2}Mn_{0.3}](OH)_2$, and there was a difference in types of mixed doping elements; and a precursor of a positive electrode active material in Comparative Example 3 was $[Ni_{0.5}Co_{0.2}Mn_{0.3}](OH)_2$, and no doping element was added. For other parameters, refer to Table 1.

Figure 3:
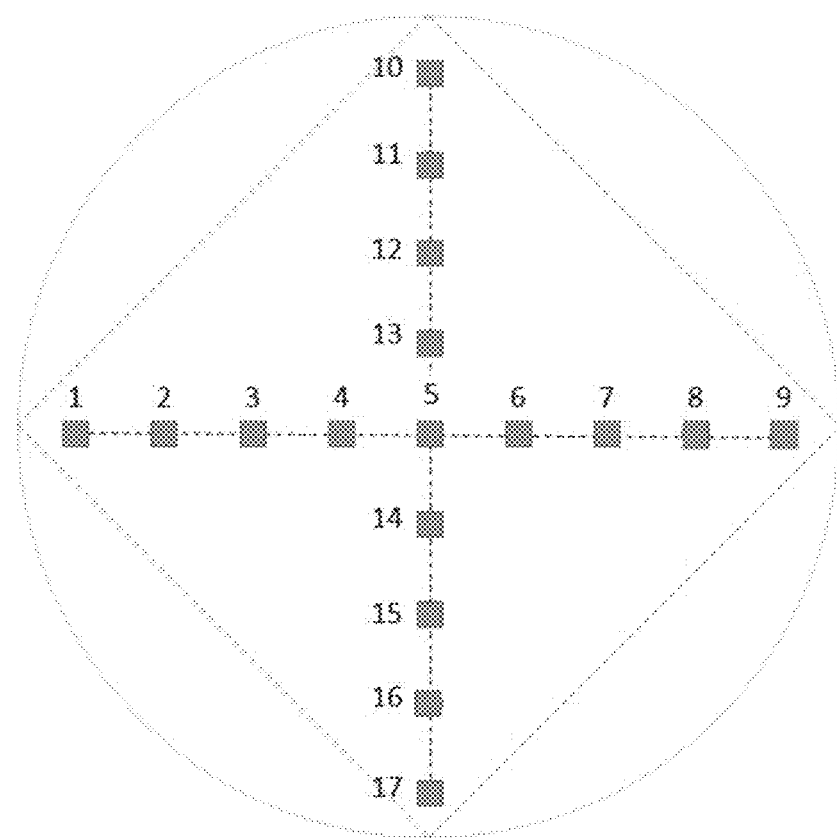
FIG. 3 is a schematic diagram of a sampling point location in a relative deviation test of a local mass concentration of a doping element in secondary particles in Examples 1 to 25 and Comparative Examples 1 to 3.

Tests (1) Deviation Test for a True Doping Concentration of Secondary Particles 2 g of powder sample of a positive electrode active material was weighed, the sample was evenly sprinkled on a sample stage with a conductive adhesive, and then the powder was gently pressed for fixing, or an electrode plate of 1 cm×1 cm was cut from a positive electrode plate of a battery, and was pasted on the sample stage as a to-be-tested sample. The sample stage was put into a vacuum sample chamber and fixed, and an IB-09010CP cross-section polisher from Japan JEOL (JEOL) was used to prepare a cross-section of the secondary particles. Points were selected with reference to 17 locations in the cross section of the secondary particles shown in FIG. 3, and an area of each point is 20 nm×20 nm. Mass concentrations of the doping elements at the 17 points were determined by using an X-Max energy dispersive spectrometer (EDS) from Oxford Instruments in UK in combination with a Sigma-02-33 scanning electron microscope (SEM) from ZEISS in Germany. A test method was as follows: Li, O, Ni, Co, Mn, and the doping elements were selected as to-be-tested elements. SEM parameters were set as follows: an acceleration voltage was 20 kV, an aperture was 60 μm, an operating distance was 8.5 mm, and a current was 2.335 A. During the EDS testing, when a spectrum area reached 250000 cts or above (controlled by collection duration and a collection rate), the test was stopped and data was collected, and the mass concentrations of the doping element at all points were obtained, which were denoted as $\eta_1, \eta_2, \eta_3, \ldots, \eta_{17}$.

A method for determining an average mass concentration $\bar{\eta}$ of the doping elements in the secondary particles was as follows: The foregoing EDS-SEM test method was used. As shown in a dashed box in FIG. 3, a test area covered all points of spot scanning for the secondary particles, and did not exceed the cross section of the secondary particles.

Then, a relative deviation a of a local mass concentration of the doping element in the secondary particles was calculated according to the formula (1).

(2) Test for a Trace Doping Concentration of a Positive Electrode Active Material True density $\rho_{true}$ of the positive electrode active material was determined by using a TD2400 powder true densitometer from Beijing Builder Electronic Technology Co., Ltd. A test method was as follows: At 25° C., a positive electrode active material with specific mass was fetched and put into a sample beaker, and a mass m of the positive electrode active material was recorded. The sample beaker containing the positive electrode active material was put into a test chamber of the true densitometer, and a test system was sealed. An inert gas with a small molecular diameter, such as helium or nitrogen, was introduced. Gas pressures in the sample chamber and a swelling chamber were tested. Then a true volume V of the to-be-tested material was determined based on Bohr's law PV=nRT, and the true density $\rho_{true}$ of the secondary particles was calculated according to m/V. Herein, n is molar mass of gas in the sample beaker. R was an ideal gas constant, which was set to 8.314; and T was an ambient temperature, which was 298.15K.

A 7000DV ICP-OES from PerkinElmer (PE) in USA was used to test the mass concentration co of the doping element in the positive electrode active material. The test method was as follows: An electrode plate containing the positive electrode active material was fetched and punched into a wafer with a total mass greater than 0.5 g or at least 5 g of a powder sample of the positive electrode active material was fetched. The sample was weighed, and mass of the sample was recorded. Then the sample was put into a digestion tank, and 10 mL of aqua regia was slowly added as a digestion reagent. Then the digestion tank was put into a Mars5 microwave digestion instrument from CEM Corporation in USA, and digestion was performed at a microwave radio frequency of 2450 Hz. A digested sample solution was transferred to a volumetric flask and shaken evenly. A sample was put into an ICP-OES sampling system. The mass concentrations of the doping elements of the positive electrode active material were tested under an argon pressure of 0.6 MPa and a radio frequency power of 1300 W.

The true doping concentration φ of the positive electrode active material was calculated according to the foregoing formula (2).

To test the positive electrode active material in the battery, the battery could be disassembled in a drying room, a middle portion of the positive electrode plate was removed and put into a beaker, an appropriate amount of high-purity anhydrous dimethyl carbonate DMC was added, the DMC was replaced every 8 hours, and the positive electrode plate was cleaned for three consecutive times, then put into a vacuum standing box in the drying room, and dried for 12 hours in a vacuum state of −0.096 MPa. After drying, an electrode plate sample was cut, and the electrode plate sample was pasted on a sample stage with a conductive adhesive; or powder of the positive electrode active material was scrapped with a blade in the drying room and used as a to-be-tested sample. The test was performed in the foregoing method.

(3) Test for Lattice Parameters a and c of a Positive Electrode Active Material

At 25° C., 18 button batteries were separately charged at a constant current of 1 C to an upper limit of a charge/discharge cut-off voltage, then charged at a constant voltage until a current was less than or equal to 0.05 mA, then left standing for 2 minutes, and then discharged at a constant current of 1 C to a lower limit of the charge/discharge cut-off voltage.

Then, the 18 charged and then discharged button batteries were charged to 2.8 V, 2.9 V, 3.0 V, 3.1 V, 3.2 V, 3.3 V, . . . , 4.0 V, 4.1 V, 4.2 V, 4.3 V, 4.4 V and 4.5 V (that is, a charging voltage step is 0.1 V) at a rate of 0.1 C respectively. Each charged button battery was fetched, and a positive electrode plate was removed as a sample in a drying room. The sample was weighed, mass was recorded, and the sample was put into a digestion tank 10 mL of aqua regia was slowly added as a digestion reagent. The digestion tank was put into a CEM-Mars5 microwave digestion instrument, and digestion was performed at a microwave radio frequency of 2450 Hz. A digester sample solution was transferred to a volumetric flask and shaken evenly. A sample was put into a PE7000DV ICP-OES sampling system, and mass concentrations of Li, O, Ni, Co, Mn and the doping elements of the positive electrode active material were tested under an argon pressure of 0.6 MPa and a radio frequency power of 1300 W. A chemical formula under each voltage was obtained through conversion based on the mass concentration of each element, and then a delithiation state under each voltage was obtained. If a chemical formula of the positive electrode, active material converted under a voltage of 2.8 V is $Li_{0.89}Ni_{0.8}Co_{0.1}Mn_{0.1}O_2$, a corresponding delithiation state is $(1-0.89) \times 100\% = 11\%$. That is, a battery voltage corresponding to the 11% delithiated state was 2.8 V. Likewise, when a chemical formula of the positive electrode active material converted through the ICP-OES test was $Li_{0.22}Ni_{0.8}Co_{0.1}Mn_{0.1}O_2$, a corresponding voltage was a voltage corresponding to a 78% delithiated state.

After the voltages corresponding to the 11% delithiated state and the 78% delithiated state were obtained, a "voltage sampling point" was selected every 0.1 V by using a voltage corresponding to the 11% delithiated state as a start point and a voltage corresponding to the 78% delithiated state as an end point within this range, to obtain a plurality of voltages including a start voltage and an end voltage in the delithiation interval of 11% to 78%. The electrode plate containing the to-be-tested positive electrode active material was fetched, and a plurality of button batteries were produced in the foregoing method (the number of button batteries depends on the number of voltages). At 25° C., the plurality of button batteries were charged to a plurality of voltages including the start voltage and the end voltage in the delithiation interval of 11% to 78% at a rate of 0.1 C, and then the following operations were performed:

In the drying room, the button battery was cut open with scissors to take out an entire positive electrode plate, the positive electrode plate was put into a beaker, an appropriate amount of high-purity anhydrous dimethyl carbonate (DMC) was added, and the DMC was replaced once every 8 hours. The positive electrode plate was cleaned for three consecutive times, then put into a vacuum standing box in the drying room, and dried for 12 hours in a vacuum state of −0.096 MPa. The dried positive electrode plate was used as a to-be-tested sample for XRD analysis. A D8 DISCOVER X-ray diffraction instrument from Brucker AxS Corporation in Germany was used to perform the XRD analysis on the sample with a CuKα ray as a radiation source, a ray wavelength of 1.5418 Å, a scanning rate of 4°/min, a test angle range of 15° to 70°, and a step length of 0.01671°, to obtain an X-ray diffraction spectrum. Lattice parameters a and c were calculated. The maximum shrinkage rate $\Delta a_{max}$ in the a-axis direction and the maximum swelling rate $\Delta c_{max}$ in the c-axis direction of the lattice were further calculated according to the foregoing calculation method.

The positive electrode in the button battery could be directly a positive electrode plate that was disassembled from the full battery in the drying room, and a middle zone of an appropriate size was punched out and selected as the positive electrode plate of the button battery.

(4) Test for an Initial Gram Capacity of a Button Battery

At 25° C., the button battery was charged at a constant current of 0.1 C to an upper limit of a charge/discharge cut-off voltage, then charged at a constant voltage until a current was less than or equal to 0.05 mA then was left standing for 2 minutes, and then discharged at a constant current of 0.1 C to a lower limit of the charge/discharge cut-off voltage. A discharging capacity in this case was the initial gram capacity of the button battery.

(5) Test for an Initial Gram Capacity of a Full Battery

At 25° C., the button battery was charged at a constant current of 1/3 C to an upper limit of a charge/discharge cut-off voltage, then charged at a constant voltage until a current was less than or equal to 0.05 mA, then was left standing for 5 minutes, and then discharged at a constant current of 1/3 C to a lower limit of the charge/discharge cut-off voltage. The discharging capacity in this case was the initial gram capacity of the full battery.

(6) Test for High-Temperature Cycling Performance of a Full Battery

At 45° C. the button battery was charged at a constant current of 1 C to an upper limit of a charge/discharge cut-off voltage, then charged at a constant voltage until a current was less than or equal to 0.05 mA, then was left standing for 5 minutes, and then discharged at a constant current of 1 C to a lower limit of the charge/discharge cut-off voltage. This was a charging and discharging cycle. A discharging capacity in this case was recorded as a discharging, specific capacity $D_1$ of the first cycle. 400 charging and discharging cycles were performed on the battery according to the foregoing method, and a discharging specific capacity $D_{400}$ at a $400^{th}$ cycle was recorded.

Capacity retention rate (%) of the full battery after 400 cycles at 1 C/1 C under 45° C.$=D_{400}/D_1 \times 100\%$ (7) Test for Structural Stability of a Positive Electrode Active Material The hill battery after 400 cycles at 1 C/1 C under 45° C. was fully charged at 1 C and discharged to 0% SOC at a rate of 0.33 C. In the drying room, scissors were used to disassemble a battery cell, and a middle portion of the entire positive electrode plate was removed and put into a beaker. An appropriate amount of high-purity anhydrous DMC was added, and replaced once every 8 hours. The positive electrode plate was cleaned for three consecutive times, then put into a vacuum standing box in the drying room, and dried for 12 hours in a vacuum state of −0.096 MPa. Three square electrode plate samples of about 2 cm×2 cm were cut from a middle zone of the dried positive electrode plate, and fixed on a sample stage of an IB-09010CP ion cross-section polisher with paraffin. A cutting voltage of 6 kV, a vacuum degree of $10^{-4}$ Pa, and an ion beam diameter of 500 μm were set to perform argon ion CP cutting. After a cross section of the entire electrode plate was cut off, the sample was transferred to a sample chamber of a Sigma-02-33 scanning electron microscope from ZEISS (ZEISS). An acceleration voltage of 10 kV, a grating of 30 μm, a current of 2.335 A, a working distance of 4 mm, and magnification of 1 KX were set, to perform SEM photographing on the cross sections of three electrode plate samples, and cross-sectional SEM electronic images of the three different electrode plates were obtained. The number of cracked particles in the positive electrode active material in each SEM electronic image and the total number of particles in all positive electrode active materials in the image were read. Proportion of cracked particles=number of cracked particles/total number of particles. An average value of proportions of the cracked particles in the cross-sectional SEM electronic images of the three different electrode plates was selected, to reflect a degree of cracking of the positive electrode active material after 400 cycles at 1 C/1 C under 45° C.

In test (3) to test (7), in Examples 1 to 22 and Comparative Examples 1 and 2, the charge/discharge cut-off voltage of the button battery was 2.8 V to 4.25 V, and the charge/discharge cut-off voltage of the full battery was 2.8 V to 4.2 V; and in Examples 23 to 25 and Comparative Example 3, the charge/discharge cut-off voltage of the button battery was 2.8 V to 4.35 V and the charge/discharge cut-off voltage of the full battery was 2.8 V to 4.3 V.

Test results of Examples 1 to 25 and Comparative Examples 1 to 3 are shown in Table 1 and Table 2.

TABLE 1

Related parameters in preparation of a positive electrode active material

| No. | Type of doping element | Mass ratio per batch | First sintering Temperature (° C.) | First sintering Time (h) | Second sintering Temperature (° C.) | Second sintering Time (h) | φ (μg/cm³) | σ (%) | ε (%) |
|---|---|---|---|---|---|---|---|---|---|
| Example 1 | Sb | 1:1 | 830 | 8 | 830 | 10 | 25140 | 10 | 10 |
| Example 2 | Te | 2:3 | 820 | 6 | 825 | 11 | 25300 | 8 | 11 |
| Example 3 | F | 3:4 | 830 | 7 | 820 | 9 | 25400 | 13 | 9 |
| Example 4 | W + F | 2:3 | 815 | 5 | 830 | 11 | 25200 | 9 | 12 |
| Example 5 | Sb + W + Te | 1:2 | 820 | 8 | 805 | 9 | 25500 | 10 | 10 |
| Example 6 | Sb | 2:5 | 815 | 6 | 825 | 12 | 1700 | 7 | 9 |
| Example 7 | Sb | 2:3 | 830 | 6 | 820 | 10 | 3000 | 11 | 8 |
| Example 8 | Sb | 1:3 | 805 | 8 | 835 | 11 | 14820 | 12 | 11 |
| Example 9 | Sb | 3:4 | 820 | 7 | 830 | 10 | 25100 | 9 | 12 |
| Example 10 | Sb | 2:3 | 825 | 4 | 815 | 13 | 30000 | 15 | 9 |
| Example 11 | Sb | 1:3 | 805 | 6 | 820 | 10 | 49180 | 8 | 10 |
| Example 12 | Sb | 1:2 | 820 | 8 | 835 | 9 | 57400 | 9 | 11 |
| Example 13 | Ru | 2:3 | 810 | 7 | 825 | 11 | 25420 | 8 | 12 |
| Example 14 | Ru | / | One sintering treatment at 720° C. for 15 h | | | | 25200 | 21 | 9 |
| Example 15 | Ru | / | One sintering treatment at 680° C. for 15 h | | | | 25200 | 32 | 11 |
| Example 16 | P | 2:3 | 835 | 6 | 825 | 13 | 25130 | 11 | 12 |
| Example 17 | V | 3:4 | 830 | 8 | 805 | 14 | 25300 | 13 | 10 |
| Example 18 | Zr | 2:5 | 820 | 7 | 815 | 11 | 25280 | 10 | 9 |
| Example 19 | Nb | 2:3 | 835 | 6 | 820 | 15 | 25310 | 10 | 11 |
| Example 20 | Ti | 1:2 | 825 | 8 | 830 | 10 | 25420 | 11 | 11 |
| Example 21 | Sb | 5:3 | 750 | 5 | 600 | 2 | 25180 | 16 | 30 |
| Example 22 | Sb | 6:4 | 600 | 3 | 550 | 2 | 25210 | 20 | 41 |
| Comparative Example 1 | / | / | One sintering treatment at 830° C. for 15 h | | | | / | / | / |
| Comparative Example 2 | Y | 3:4 | 820 | 8 | 835 | 10 | 25120 | 9 | 10 |
| Example 23 | Sb | 1:2 | 830 | 9 | 835 | 11 | 25080 | 13 | 9 |
| Example 24 | Ru | 2:3 | 825 | 8 | 830 | 13 | 24900 | 9 | 11 |
| Example 25 | Y | 3:4 | 835 | 8 | 825 | 10 | 25290 | 10 | 10 |
| Comparative Example 3 | / | / | One sintering treatment at 830° C. for 15 h | | | | / | / | / |

In Table 1, φ is a true doping concentration of the positive electrode active material; σ is a relative deviation of a local mass concentration of the doping element in the secondary particles; and ε is a deviation of a mass concentration of the doping element in the positive electrode active material relative to an average mass concentration of the doping element in the secondary particles.

Mass ratio of batches=Mass of a precursor of a first batch of doping elements/Mass of a precursor of a second batch of doping elements.

TABLE 2

| No. | $\Delta a_{max}$ (%) | $\Delta c_{max}$ (%) | Initial gram capacity of button battery (mAh/g) | Initial gram capacity of full battery (mAh/g) | Capacity retention rate (%) of full battery after 400 cycles at 1 C/1 C under 45° C. | Cracking degree (%) of positive electrode active material of full battery after 400 cycles at 1 C/1 C under 45° C. |
|---|---|---|---|---|---|---|
| Example 1 | 2.28 | 2.39 | 207.3 | 197.6 | 93.88 | 45.3 |
| Example 2 | 2.54 | 2.65 | 205.7 | 195.4 | 92.25 | 56.7 |
| Example 3 | 2.77 | 2.84 | 206.1 | 195.3 | 91.83 | 74.5 |
| Example 4 | 2.26 | 2.32 | 206.9 | 197.1 | 93.51 | 43.1 |
| Example 5 | 2.50 | 2.57 | 207.1 | 196.5 | 92.13 | 52.8 |
| Example 6 | 2.92 | 3.02 | 201.4 | 191.2 | 84.71 | 79.4 |
| Example 7 | 2.75 | 2.84 | 202.1 | 191.7 | 85.18 | 68.9 |
| Example 8 | 2.44 | 2.54 | 206.8 | 195.5 | 91.94 | 51.3 |
| Example 9 | 2.30 | 2.36 | 207.6 | 196.4 | 93.13 | 47.5 |
| Example 10 | 2.49 | 2.60 | 205.8 | 196.1 | 92.14 | 56.8 |
| Example 11 | 2.72 | 2.87 | 204.1 | 194.2 | 90.12 | 66.4 |
| Example 12 | 2.85 | 2.96 | 202.0 | 190.9 | 85.65 | 78.9 |
| Example 13 | 2.50 | 2.51 | 206.4 | 195.8 | 91.93 | 49.7 |
| Example 14 | 2.85 | 2.93 | 201.5 | 192.8 | 84.97 | 77.8 |
| Example 15 | 3.00 | 3.02 | 198.5 | 191.6 | 84.91 | 84.6 |
| Example 16 | 2.85 | 2.87 | 203.3 | 194.5 | 89.54 | 80.3 |
| Example 17 | 2.81 | 2.80 | 202.7 | 193.6 | 90.24 | 79.5 |
| Example 18 | 2.44 | 2.54 | 203.5 | 197.8 | 90.85 | 67.1 |
| Example 19 | 2.37 | 2.43 | 206.4 | 197.9 | 92.87 | 55.3 |
| Example 20 | 2.31 | 2.38 | 207.4 | 198.5 | 92.34 | 46.2 |
| Example 21 | 2.28 | 2.34 | 205.8 | 195.8 | 92.46 | 61.5 |
| Example 22 | 2.29 | 2.36 | 204.9 | 193.7 | 90.62 | 77.4 |
| Comparative Example 1 | 3.27 | 3.31 | 197.3 | 186.2 | 81.35 | 93.4 |
| Comparative Example 2 | 3.18 | 3.24 | 200.5 | 190.9 | 83.18 | 92.8 |
| Example 23 | 1.77 | 2.07 | 176.4 | 172.4 | 94.14 | 39.4 |
| Example 24 | 1.84 | 2.24 | 175.8 | 170.7 | 93.86 | 41.7 |
| Example 25 | 2.30 | 2.70 | 172.3 | 166.2 | 91.74 | 57.8 |
| Comparative Example 3 | 2.35 | 3.05 | 171.0 | 164.8 | 89.27 | 63.5 |

From results of comparison between Examples 1 to 20 and Comparative Examples 1 and 2, and between Examples 23 to 25 and Comparative Example 3, it could be learned that modification was implemented through doping, the shrinkage rate along the a-axis direction and the swelling rate along the c-axis direction of the lattice of the nickel-containing lithium composite oxide were controlled within a predetermined range, so that the lithium-ion secondary battery could have relatively high initial gram capacity, structural stability and high-temperature cycling performance.

It could be seen from results of Example 1 and Examples 6 to 12 that when a doping amount was less than 2300 μg/cm³, the doping, element had an unapparent inhibitory effect on shrinkage along the a-axis direction and swelling along the c-axis direction of the lattice of the positive electrode active material during charging/discharging. Cracking of the positive electrode active material was still severe, the capacity of the corresponding battery was low, and the high-temperature cycling performance was poor. When the doping amount exceeded 49000 μg/cm³, the excessively large amount of doping elements damaged an original positive electrode structure. As a result, the positive electrode active material had a relatively large shrinkage rate along the a-axis direction and swelling rate along, the c-axis direction, a cracking degree of the particles was high, and the capacity and cycling performance of the battery under 45° C. were inferior to those of the positive electrode active material with a true doping concentration φ of 2300 μg/cm³ to 49000 μg/cm³.

It could be seen from the results of Examples 13 to 15 that when the relative deviation of the local mass concentration of the doping element inside the secondary particles was less than 20%, the doping elements were uniformly distributed inside the active material, and had an apparent inhibitory effect on shrinkage along the a-axis direction and swelling along the c-axis direction of the lattice of the material during charging/discharging, a cracking degree of the positive electrode active material was low, and capacity and high-temperature cycling performance of the corresponding battery cell were better. On the contrary, when the relative deviation of the local mass concentration of the doping element in the secondary particles was greater than 20%, lattices in an unevenly doped zone varied greatly causing the positive electrode active material to crack and deteriorating the capacity and high-temperature cycling performance of the battery.

It could be seen from comparison of the results of Examples 1, 21, and 22 that when the positive electrode active material satisfied that ε was less than 30%, more of the doping element could be doped into the secondary particles, to fully exert the inhibitory effect of the doping elements on shrinkage along the a-axis direction and swelling along the c-axis direction of the lattice, thereby reducing cracking of particles and improving the capacity and high-temperature cycling performance of the battery However, when ε was greater than 30%, many doping elements were distributed in gaps or surfaces of the secondary particles, and the doping elements insufficiently inhibited changes of the lattice. As a result, the positive electrode active material still had a problem of cracking, but doping elements distributed on the surfaces could isolate a side reaction of the electrolyte to some extent. Therefore, in this case, the capacity and high-temperature cycling performance of the battery cell were slightly reduced.

Figure 2:
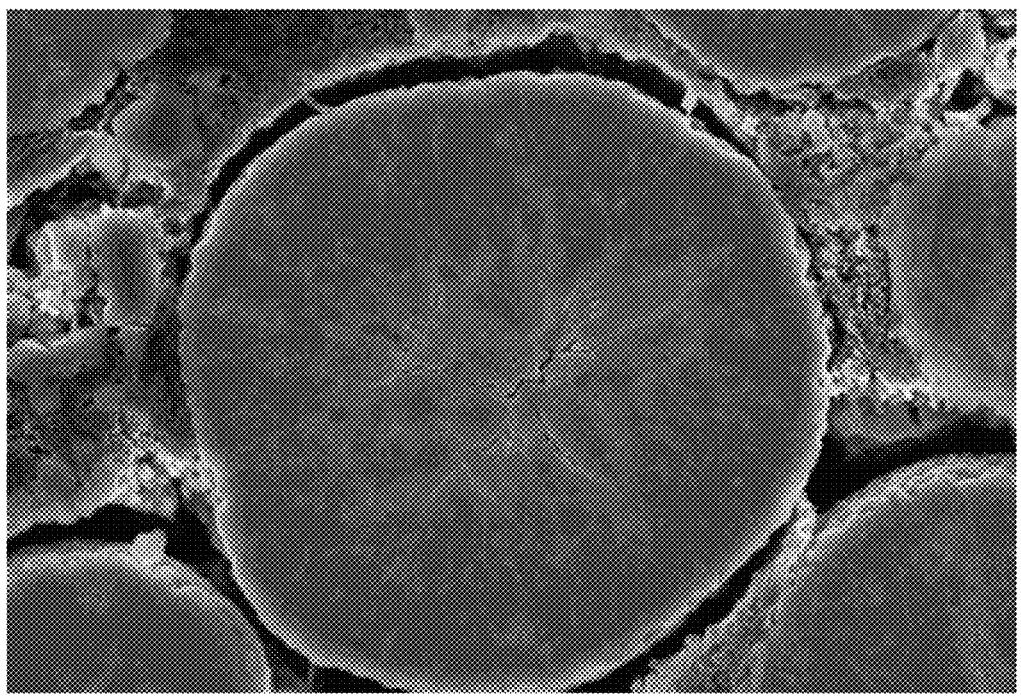
FIG. 2 is a SEM image of a positive electrode active material after cycling according to Comparative Example 1.

Comparison results of cracking degrees of the positive electrode active materials after 400 cycles at 1 C/1 C under 45° C. in Example 1 and Comparative Example 1 in FIG. 1 and FIG. 2 also proved that when the shrinkage rate along the a-axis direction and the swelling rate along the c-axis direction of the lattice of the nickel-containing lithium composite oxide were controlled within a predetermined range through modification by doping, the positive electrode active material was not prone to cracking during high-temperature cycling and the structural stability was significantly improved.

The foregoing descriptions are merely specific embodiments of this application, but are not intended to limit the protection scope of this application. Any equivalent modifications or replacements readily figured out by a person skilled in the art within the technical scope disclosed in this application shall fall within the protection scope of this application. Therefore, the protection scope of this application shall be subject to the protection scope of the claims.

What is claimed is:

1. A positive electrode active material, comprising secondary particles formed by agglomeration of primary particles, wherein the primary particles comprise a layered nickel-containing lithium composite oxide, and the nickel-containing lithium composite oxide comprises a doping element; and
when the positive electrode active material is charged from an 11% delithiated state to a 78% delithiated state at a rate of 0.1 C, a lattice of the primary particles has a maximum shrinkage rate satisfying $\Delta a_{max} \leq 3.00\%$ in an a-axis direction, and a maximum swelling rate satisfying $\Delta c_{max} \leq 3.02\%$ in a c-axis direction;
wherein a relative deviation of a local mass concentration of the doping element in the secondary particles is less than 30%; and
wherein a true doping concentration $\varphi$ of the positive electrode active material satisfies 2300 $\mu g/cm^3 \leq \varphi \leq 49000$ $\mu g/cm^3$.

2. The positive electrode active material according to claim 1, wherein a molar percentage of nickel in elements at a transition metal site of the nickel-containing lithium composite oxide is 50% to 95%.

3. The positive electrode active material according to claim 1, wherein
when a molar percentage of nickel in elements at a transition metal site of the nickel-containing, lithium composite oxide is 50% to 60% and the positive electrode active material is charged from an 11% delithiated state to a 78% delithiated state at a rate of 0.1 C, a lattice of the primary particles has a maximum shrinkage rate satisfying $\Delta a_{max} \leq 2.69\%$ in an a-axis direction, and a maximum swelling rate satisfying $\Delta c_{max} \leq 2.75\%$ in a c-axis direction; or
when a molar percentage of nickel in elements at a transition metal site of the nickel-containing, lithium composite oxide is greater than 60% and less than or equal to 90% and the positive electrode active material is charged from an 11% delithiated state to a 78% delithiated state at a rate of 0.1 C, a lattice of the primary particles has a maximum shrinkage rate satisfying $\Delta a_{max} \leq 2.85\%$ in an a-axis direction, and a maximum swelling rate satisfying $\Delta c_{max} \leq 2.93\%$ in a c-axis direction.

4. The positive electrode active material according to claim 1, wherein the doping element comprises a first doping element doping the transition metal site of the nickel-containing lithium composite oxide; and
when the positive electrode active material is in the 78% delithiated state, the first doping element has a valence higher than or equal to +3.

5. The positive, electrode active material according to claim 4, wherein the first doping element is selected from one or more of Si, Ti, V, Ge, Se, Zr, Nb, Ru, Pd, Rh, Sb, Te, Ce, and W.

6. The positive electrode active material according to claim 1, wherein the doping element comprises a second doping element doping an oxygen site of the nickel-containing lithium composite oxide, and the second doping element is selected from one or more of F, N, P, and S.

7. The positive electrode active material according to claim 1, wherein a deviation $\varepsilon$ of a mass concentration of the doping element in the positive electrode active material relative to an average mass concentration of the doping element in the secondary particles satisfies $\varepsilon < 50\%$.

8. The positive electrode active material according, to claim 1, wherein a true density $\rho_{true}$ of the positive electrode active material satisfies 4.6 $g/cm^3 \leq \rho_{true} \leq 4.9$ $g/cm^3$.

9. The positive electrode active material according to claim 1, wherein the positive electrode active material also satisfies one or more of the following requirements (1) to (4):
  (1) a volume average particle size $D_v50$ of the positive electrode active material is 5 μm to 20 μm;
  (2) a specific surface area of the positive electrode active material is 0.2 $m^2/g$ to 1.5 $m^2/g$,
  (3) tap density of the positive electrode active material is 2.3 $g/cm^3$ to 2.8 $g/cm^3$; and
  (4) compacted density of the positive electrode active material under a pressure of 5 tons (equivalent to 49 kN) is 3.1 $g/cm^3$ to 3.8 $g/cm^3$.

10. The positive electrode active material according to claim 1, wherein
the nickel-containing lithium composite oxide satisfies a chemical formula $Li_{1+m}[Ni_xCo_yMn_zM_p]O_{2-q}X_q$, wherein M and X are the doping elements, M is selected from one or more of Si, Ti, V, Ge, Se, Zr, Nb, Ru, Pd, Rh, Sb, Te, Ce, and W, X is selected from one or more of F, N, P, and S, $0.5 \leq x \leq 1$, $0 \leq y < 0.3$, $0 \leq z < 0.3$, $-0.1 \leq m < 0.2$, $0 \leq p < 0.3$, $0 \leq q < 0.2$, $x+y+z+p=1$, and p and q are not 0 simultaneously; or
the nickel-containing lithium composite oxide satisfies a chemical formula $Li_{1+n}[Ni_{r-d}Co_sMn_tM'_d]O_{2-v}X'_v$, wherein M' and X' are the doping elements, M' is selected from one or more of Si, Ti, Ge, Se, Zr, Nb, Ru, Pd, Rh, Sb, Te, Ce, and W, X' is selected from one or more of F, N, P, and S, $0.5 \leq r-d < 1$, $0 \leq s < 0.3$, $0 \leq t < 0.3$, $-0.1 \leq n < 0.2$, $0 \leq d < 0.3$, $0 \leq v < 0.2$, $r+s+t=1$, and d and v are not 0 simultaneously.

11. A positive electrode plate, comprising a positive electrode current collector and a positive electrode active substance layer disposed on the positive electrode current collector, wherein the positive electrode active substance layer comprises the positive electrode active material according to claim 1.

12. A lithium-ion secondary battery, comprising the positive electrode plate according to claim 11.

\* \* \* \* \*